US010511611B2

(12) United States Patent
Glazner et al.

(10) Patent No.: US 10,511,611 B2
(45) Date of Patent: Dec. 17, 2019

(54) CONDITIONAL CONTENT ACCESS

(71) Applicant: Cisco Technology, Inc., San Jose, CA (US)

(72) Inventors: Yoav Glazner, Beit Shemesh (IL); Amitay Stern, Jerusalem (IL)

(73) Assignee: Cisco Technology, Inc., San Jose, CA (US)

( * ) Notice: Subject to any disclaimer, the term of this patent is extended or adjusted under 35 U.S.C. 154(b) by 52 days.

(21) Appl. No.: 15/261,960

(22) Filed: Sep. 11, 2016

(65) Prior Publication Data

US 2018/0077170 A1 Mar. 15, 2018

(51) Int. Cl.
*H04L 29/06* (2006.01)
*H04N 21/4623* (2011.01)
*G06F 21/10* (2013.01)

(52) U.S. Cl.
CPC ............ *H04L 63/123* (2013.01); *G06F 21/10* (2013.01); *H04N 21/4623* (2013.01)

(58) Field of Classification Search
CPC .... G09B 5/06; G06F 21/31; G06F 2221/2133
See application file for complete search history.

(56) References Cited

U.S. PATENT DOCUMENTS

| 8,275,659 | B2 | 9/2012 | Ellis et al. |
| 8,356,506 | B2 | 1/2013 | Smith |
| 8,510,795 | B1* | 8/2013 | Gargi ............... G09B 5/06 |
| | | | 382/276 |
| 8,719,088 | B2 | 5/2014 | O'Sullivan et al. |
| 9,177,335 | B1 | 11/2015 | Carasso |
| 2003/0050833 | A1 | 3/2003 | Hamzy et al. |
| 2004/0028226 | A1 | 2/2004 | Saar et al. |
| 2007/0143624 | A1* | 6/2007 | Steeves ............ G06F 21/36 |
| | | | 713/182 |
| 2007/0154089 | A1* | 7/2007 | Kao ............... G06T 5/40 |
| | | | 382/168 |
| 2008/0319862 | A1 | 12/2008 | Golan et al. |

(Continued)

FOREIGN PATENT DOCUMENTS

WO WO 2015/100372 7/2015

OTHER PUBLICATIONS

"The cost of ad blocking: PageFair and Adobe 2015 Ad Blocking Report": available on the web at: https://blog.pagefair.com/2015/ad-blocking-report/.

(Continued)

*Primary Examiner* — Mohammed Waliullah

(57) ABSTRACT

In one embodiment, a method comprises: in response to a request of a user device to access first content, sending a challenge, relating to digital video included in second content, the challenge at least indicative of positions that include a plurality of frames; receiving a response to the challenge, the response at least indicative of values; attempting to validate the response, including determining values of pixels in the digital video associated with positions indicated by at least one of: the challenge or the response, and comparing the values indicated by the response, or a function thereof, to the determined values, or a function thereof; and performing at least one action relating to access to the first content, dependent on whether or not the attempt to validate the response was successful.

21 Claims, 5 Drawing Sheets

(56) References Cited

U.S. PATENT DOCUMENTS

| | | | |
|---|---|---|---|
| 2009/0249477 A1* | 10/2009 | Punera | G06F 21/31 726/18 |
| 2013/0046612 A1 | 2/2013 | Prihodko et al. | |
| 2014/0129352 A1 | 5/2014 | Ringdahl | |
| 2014/0229298 A1 | 8/2014 | Grun | |
| 2014/0250538 A1* | 9/2014 | Rapaport | G06F 21/31 726/28 |
| 2014/0282696 A1 | 9/2014 | Mao et al. | |
| 2015/0143495 A1* | 5/2015 | Okada | G06F 21/31 726/7 |

OTHER PUBLICATIONS

Crichton, Danny: "Adblocking and the End of Big Advertising"; Jun. 7, 2015: available on the web at http://techcrunch.com/2015/06/07/adblocking/.

Jackson, Jasper et al; "German broadcasters lose AdBlock Plus legal challenge"; May 27, 2015: available on the web at: http://www.theguardian.com/media/2015/may/27/german-broadcasters-adblock-rtl-prosiebensal1-eyec.

Newman, Nic: Reuters Institute Digital News Report 2015—Full Report.

Rosenwald, Michael; "The Digital Media Industry Needs to React to Ad Blockers. . . or Else"; in Columbia Journalism Review, Sep./Oct. 2015; available on the web at: http://www.cjr.org/business_of_news/will_ad_blockers_kill_the_digital_media_industry.php.

Smith, Matt; "Are Ad Blocking Browser Extensions Killing The Internet?" Sep. 6, 2011.

* cited by examiner

CONDITIONAL CONTENT ACCESS

TECHNICAL FIELD

The present disclosure generally relates to content that includes digital video.

BACKGROUND

A user device may prevent certain content from being provided to a user. For example, a web-browser (also known as a "browser") on a user device may prevent the content from being provided by blocking HTTP requests for the content, hiding HTML, elements of the content, not displaying a webpage which includes the content, etc.

BRIEF DESCRIPTION OF THE DRAWINGS

The present disclosure will be understood and appreciated more fully from the following detailed description, taken in conjunction with the drawings in which.

DESCRIPTION OF EXAMPLE EMBODIMENTS

Overview

Figure 1:
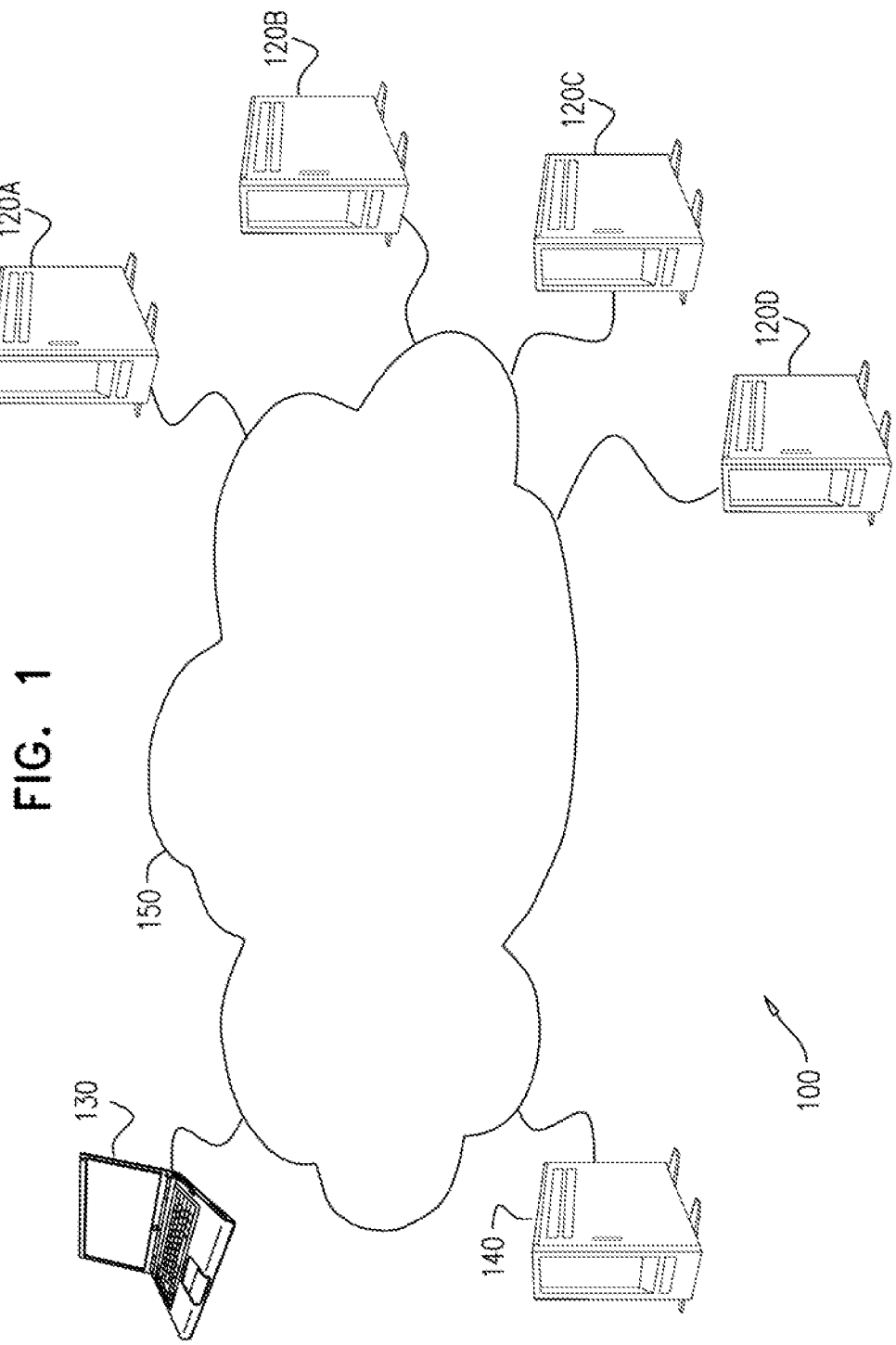
FIG. 1 is schematic illustration of a system for conditional content access, in accordance with some embodiments of the presently disclosed subject matter.

There is provided, in accordance with some embodiments of the presently disclosed subject matter a method comprising: in response to a request of a user device to access first content, sending a challenge, relating to digital video included in second content, the challenge at least indicative of positions that include a plurality of frames; receiving a response to the challenge, the response at least indicative of values; attempting to validate the response, including determining values of pixels in the digital video associated with positions indicated by at least one of: the challenge or the response, and comparing the values indicated by the response, or a function thereof, to the determined values, or a function thereof; and performing at least one action relating to access to the first content, dependent on whether or not the attempt to validate the response was successful.

Example Embodiments

In some cases, it may be desirable that before a user device may access certain content (referred to herein as "first content"), digital video that is included in certain other content (referred to herein as "second content") be played. However the digital video (also referred to herein as "video") may not always be played. For instance, video relating to set-up, warning, training, promotion (i.e. advertisement) etc., may not be played even though such video may be beneficial to a user, user device, the network, the first content provider and/or the second content provider. For example, assume that after viewing a "set up" video regarding content (e.g. an application) that is to be downloaded, a user may be more likely to customize the application features to be downloaded and/or installed on the user device rather than downloading and installing all available features. The customization in this example may reduce network bandwidth requirements for the application, reduce user device downloading time, reduce user device memory requirements, and/or improve efficiency of application execution on the user device.

As another example, assume that after viewing a (warning) video regarding legal ramifications of downloading copyrighted content, a user may be more likely to forego downloading copyrighted material that is legally problematic. The abstaining from downloading in this example may reduce traffic on a network (e.g. Internet). As another example, assume that after viewing a training video regarding an application, a user may be more likely to use the application correctly. The correct use of the application in this example may allow the application to execute more efficiently on the user device. As another example, assume that if a promotional video is not played, first content that is supported by the promotional revenue may not be provided to the user device. The non-provision in this example may reduce traffic on the network. The above examples are not meant to be comprehensive and many examples may be within the scope of the subject matter.

It is noted that it is possible that even though viewing of the video may be beneficial to a user, user device, network, content provider(s) etc., in some embodiments the user may try to avoid viewing the video. Therefore, the description below takes into account various possibilities which may be relevant depending on the propensity of the user and/or any implementation to avoid display of the video. For example, after a challenge is sent which requires that the video be played in order to respond to the challenge, the video may play and display normally on a user device which was used by the user to request access to the first content; the video may be played (by an actual or emulated player) on the user device but not necessarily displayed; the video may be intercepted by a pseudo user device which does not have the ability to display, or may be passed to the pseudo user device by the user device, and may be played on the pseudo user device instead of on the user device; the video may not be played at all or may not be played after the challenge was sent out but may have been played before. The above list is not necessarily comprehensive and there may be other examples where avoidance of display of the video may be attempted, despite the challenge. Some of the embodiments described below may attempt to make it less likely and/or less worthwhile for the video to not be played and displayed after the challenge is sent.

Although not necessarily so, an actual player may have been specially constructed and/or specially configured for the inherent purpose of playing video whereas an item acting as an emulated player may be deviating from the inherent purpose thereof of the item when playing video. Typically although not necessarily an actual player may be commercially available for free or for a fee. Challenges that may be sent will be discussed below.

The first content whose access may be conditional on prior playing of the video is not limited. However for the sake of further illustration some examples are now provided. For example, the first content may include content available via the Internet (e.g. from world wide web). For another example, the first content may additionally or alternatively include content available by way of TV or Pay-TV broadcasting, etc. For another example, the first content may additionally or alternatively include application(s), game(s), music, video(s), and/or any type of content, etc.

The second content may only include video (to which the challenge is related) or may also include additional content. If the second content also includes additional content, the additional content is not limited, in that the additional content may include the same type of content as the video and/or different type(s) of content. For instance, the additional content may or may not relate to set-up, warning, training, promotion, etc., if the video is such type of content.

Referring now to the drawings, FIG. 1 is a schematic illustration of a system 100 for conditional content access, in accordance with some embodiments of the presently disclosed subject matter.

In the illustrated embodiments, system 100 may include one or more supporting device(s) 120, a user device 130 associated with a user that is requesting access to the first content, and optionally one or more pseudo user device(s) 140. Any two or more of devices 120, 130 and/or 140 may be concentrated in one location or distributed in a plurality of locations. Although pseudo user device(s) 140 may be used to perform certain stage(s) of method(s) described below, some embodiments of the subject matter may be designed to discourage such use.

The type of user device 130 is not limited, and any user device that may be operative to play video and provide video for display to a user may be used. However for the sake of further illustration, some examples are now provided. For example, user device 130 may be a set-top box (e.g. hybrid IPTV, etc.), a smart TV, a smartphone, a personal computer, a laptop, a Blu-ray player, a digital media player etc. User device 130 may be operative to provide video for display on an embedded display (i.e. display that is part of user device 130) and/or on a separate display (i.e. display that is not part of user device 130 such as a monitor or a TV screen). It is possible that although user device 130 may be operative to provide video for display, user device 130 may not necessarily provide video included in the second content for display, for example due to some sort of blocking software (e.g. ad-blocking software) on user device 130. Some embodiments of the method(s) described below may be designed to encourage provision of the video included in the second content for display.

In embodiments where system 100 includes pseudo user device(s) 140, pseudo user device(s) may be any device that may be operative to play video but may not be operative to provide video for display to a user. For simplicity's sake, the disclosure refers to pseudo user device 140 in the single form but the reference should be understood to include embodiments where there is one pseudo user device performing stages described below and embodiments where there is a plurality of pseudo user devices sharing performance of stages described below. Pseudo user device 140, when included in system 100, may be operative to intercept video before the video may reach user device 130, or may be operative to receive the video from user device 130. Device 140 may be referred to as a pseudo user device because device 140 may be operative to perform stage(s) of one or more method(s) that user device 130 may be expected to perform, in the place of user device 130. The type of pseudo user device 140 is not limited, when included in system 100, but for the sake of further illustration some examples are now provided. For example pseudo user device 120 may be a proxy server, may be a device of a network service provider (e.g. of an Internet service provider, a mobile network service provider, TV service [e.g. cable] provider, etc.), may be a peer device of user device 130 that may not necessarily interact with supporting device(s) 120, etc.

One or more supporting devices 120 may be (collectively) operative to support conditional content access by user device 130. In the illustrated embodiments, four supporting devices 120A, 120B, 120C, and 120D are shown in FIG. 1 (any of which may be also referred to herein as supporting device 120). Although devices 120A, 120B, 120C, and 120D are illustrated as single devices and referred to in the single form, reference to a particular device 120 in the single form should be construed as covering embodiments where there is a single particular device or a plurality of the particular device. Supporting device 120A, for example, may be operative at least to validate a response to a challenge. Supporting device 120B, for example may be operative at least to provide first content (e.g. to user device 130, pseudo user device 140 and/or to another supporting device 120), or in other words may be considered to at least act as a first content provider. For instance, supporting device 120B may be associated with the owner of the first content (e.g. individual, group, company, organization, etc. which owns the first content.) The owner of the first content may additionally or alternatively be referred to as the first content provider.

Supporting device 120C, for example may be operative at least to provide second content (e.g. to user device 130, pseudo user device 140 and/or to another supporting device 120), or in other words may be considered to at least act as a second content provider. For instance, device 120C may be associated with the owner of the second content (e.g. individual, group, company, organization, etc. which owns the second content). The owner of the second content may additionally or alternatively be referred to as the second content provider. Supporting device 120D, for example may be operative to provide missing challenge fulfillment functionality, and may therefore be termed a fulfiller provider supporting device.

However, the quantity of supporting devices 120 is not limited, and if there is a plurality of supporting devices 120 the subject matter does not limit how operation(s) attributed herein in various embodiments to supporting device(s) 120 may be divided among the plurality. Therefore supporting devices 120 shown in FIG. 1 should not be considered binding. Possible operations by supporting device(s) 120 may include, for instance, any of the following: receiving a request for access to first content, sending or causing to be sent second content, sending a challenge, receiving a response, attempting to validate the response, providing missing challenge fulfillment functionality, sending or causing to be sent first content, providing first content, providing second content, performing at least one (other) action relating to access to first content depending on whether or not an attempt to validate a response was successful, and/or other operation(s) described herein.

For example, assuming access to first content is conditional on playing of video included in second content, the first content and second content may be provided by the same supporting device 120 or different supporting devices 120. As another example, an attempt to validate the response may be performed by the same supporting device 120 that provided at least one of first or second content, or may be performed by a different supporting device 120. As another example, missing challenge fulfillment functionality may be provided, if not already existing on device 130 or 140, by the same supporting device 120 which performs validation and/or provides at least one of first or second content, or by a different supporting device 120. In examples where there may be a plurality of supporting devices 120, any operation attributed to a particular supporting device or devices 120 in some embodiments, may in some other embodiments be additionally or alternatively performed by one or more other supporting device(s) 120.

In some embodiments, any of supporting device(s) 120 may be considered to be server(s), and user device 130 may be considered to be the client, interacting as per a server-client model. In these server-client embodiments, and depending on the example, the service(s) provided by supporting device(s) 120 may or may not be in accordance with grid computing, e.g. in accordance with one or more specific type(s) of grid computing such as fog computing, dew computing, cloud computing, etc. Additionally or alternatively, in some embodiments, any supporting device 120 may not necessarily have a server-client relationship with user device 130, and/or may or may not interact with user device 130 in accordance with one or more other type(s) of model(s) (e.g. peer to peer, broadcasting via broadcast network, etc.).

If included in system 100, pseudo user device 140 may or may not interact with supporting device(s) 120. In embodiments where there is interaction with supporting device(s) 120, pseudo user device 140 may or may not have a client-server relationship with supporting device(s) 120 (e.g. in accordance or not in accordance with grid computing, such as cloud computing, etc.), and/or may or may not interact with supporting device(s) 120 in accordance with one or more other type(s) of model(s). The interaction of pseudo user device 140, if included in system 100, may or may not be as a server to user device 120 acting as a client (e.g. in accordance or not in accordance with grid computing, such as cloud computing, etc.), and/or may or may not be in accordance with one or more other type(s) of model(s).

Any of devices 120, 130 and/or 140 in system 100 may communicate via one or more networks 150. For simplicity's sake, FIG. 1 illustrates one network 150, but in some embodiments there may be a plurality of networks 150. Any particular communication between any two devices may be directly communicated or may be communicated via one or more intermediary device(s), and therefore usage of terms such as "communicate", "send", "transmit", "receive", "respond", "request", "answer", etc. herein should be construed to cover embodiments with direct communication and embodiments with indirect communication. The type(s) of networks 150 is not limited, but for the sake of further illustration some examples are now provided. For example, a network between any two devices may be wired and/or wireless. Continuing with the example, a network between any two devices may include a cellular network, a personal area network, a local area network, a wide area network, an internetwork, the Internet, a cable network, a public switched telephone network, a broadcast network (terrestrial, satellite, etc.), a two-way radio network, etc., or any combination of the above.

Figure 2:
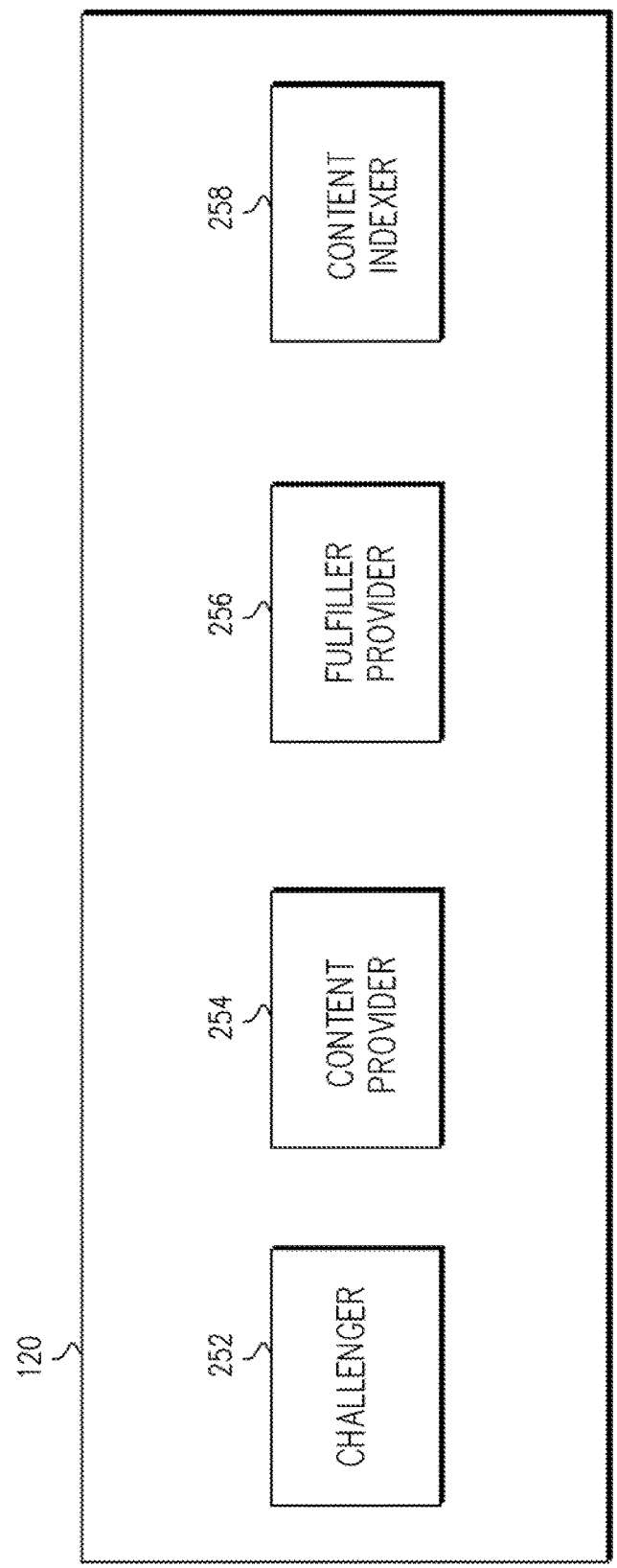
FIG. 2 is a block diagram of a validating supporting device, in accordance with some embodiments of the presently disclosed subject matter.

FIG. 2 is a block diagram of a particular supporting device 120 ("validating supporting device" 120), in accordance with some embodiments of the presently disclosed subject matter. Validating supporting device 120 is named as such, because validating supporting device may be at least operative to attempt to validate a response to a challenge. For simplicity's sake validating supporting device 120 is referred to herein in the single form. However, it is possible that a plurality of devices may collectively perform the operations ascribed herein to validating supporting device 120. Therefore reference to validating supporting device 120 in the single form, should be construed as covering embodiments where a single device performs these operations, or a plurality of devices perform these operations.

In the illustrated embodiments, validating supporting device 120 may include a challenger 252 operative to handle a challenge relating to a digital video. In the illustrated embodiments, validating supporting device 120 may also include any of the following optional modules: a content provider 254 operative to provide first content, second content and/or other content, a fulfiller provider 256 operative to provide (missing) challenge fulfillment functionality, and/or a content indexer 258 operative to index content. In some embodiments, any one of these optional modules may be omitted from system 100 or may be provided by other supporting device(s) 120, such as described above with reference to FIG. 1.

Figure 3:
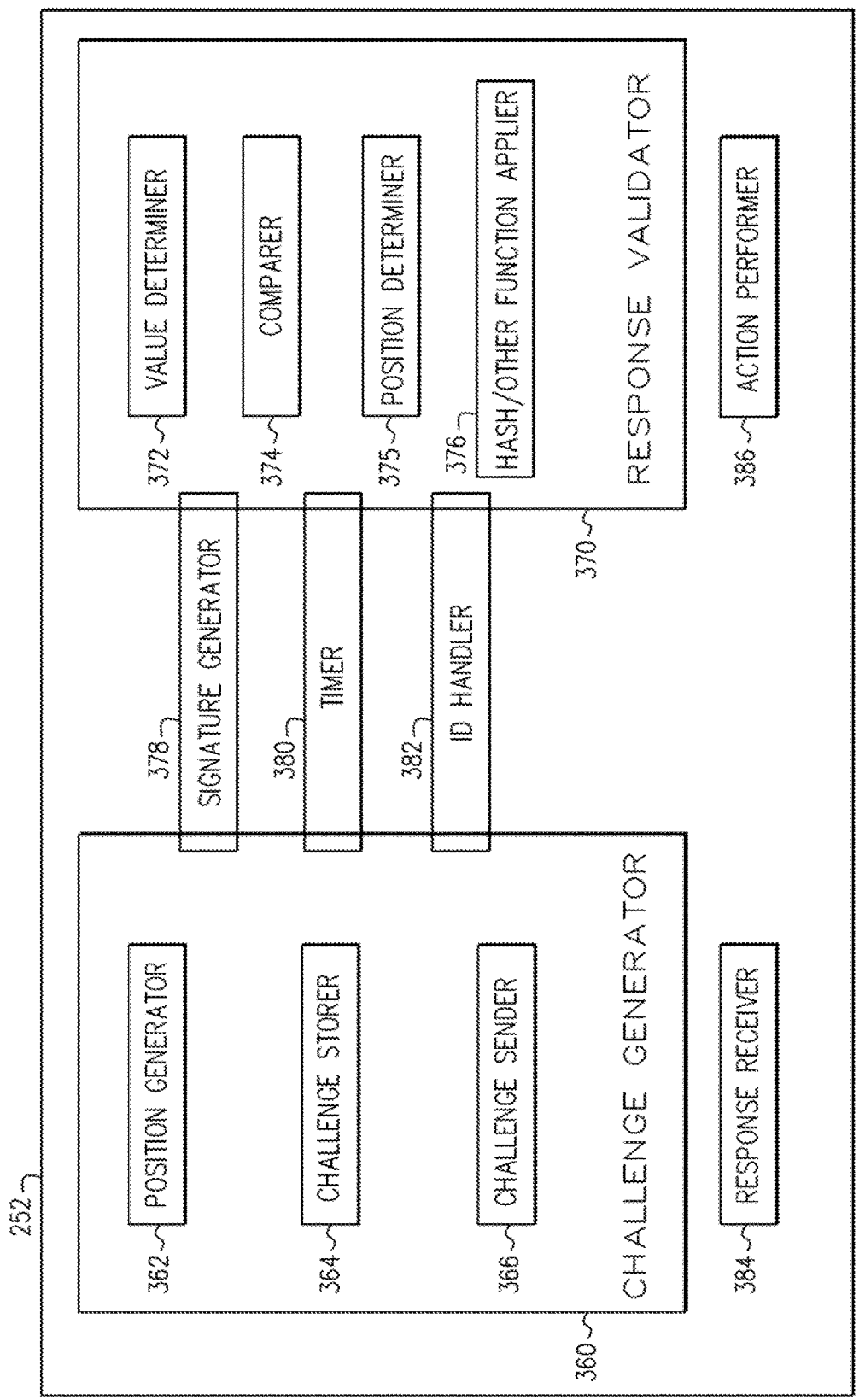
FIG. 3 is a block diagram of a challenger module in the validating supporting device of FIG. 2, in accordance with some embodiments of the presently disclosed subject matter.

FIG. 3 is a block diagram of challenger 252, in accordance with some embodiments of the presently disclosed subject matter. In the illustrated embodiments, challenger 252 may include a challenge generator 360 operative to generate a challenge (e.g. a challenge packet) relating to video playing, a response receiver 384 operative to receive a response to the challenge, a response validator 370 operative to attempt to validate a received response; and an action performer 386 operative to perform at least one action relating to user device content access, dependent on whether or not an attempt to validate a response was successful. For example, challenge generator 360 may include a position generator 362 operative to generate positions to be indicated by the challenge, a challenge sender 366 operative to send the challenge, and optionally a challenge storer 364 operative to store at least part of the challenge and/or data relating to the challenge (e.g. values of pixels associated with indicated positions).

For example, response validator 370 may include a value determiner 372 operative to determine the value(s) of pixel(s) associated with certain position(s) in the video, a comparer 374 operative to compare, optionally a position determiner 375 operative to convert relative positions to absolute positions and/or to determine positions by applying a hash function and/or other function(s) (in conjunction with hash/other function applier 376), and optionally a hash/other function applier 376 operative to apply hash (such as SHA e.g. SHA-1, SHA-256, etc.) and/or other function(s). Optional modules which may be included in challenger generator 360, response validator 370 or both may include a signature generator 378 operative to generate and/or check a signature (e.g. using RSA), a timer 380 operative to handle time (e.g. to include a time stamp in the challenge, to check time(s), etc.), and/or an identifier ("ID") handler 382 operative to handle one or more IDs (e.g. first content ID, second content ID, user device ID, challenger ID, session ID, etc.). In some other embodiments, any one of the optional modules illustrated in FIG. 3 may be omitted from challenger 252, or may be provided by other supporting device(s) 120, such as described above with reference to FIG. 1, or by other module(s) of validating supporting device 120.

Figure 4:
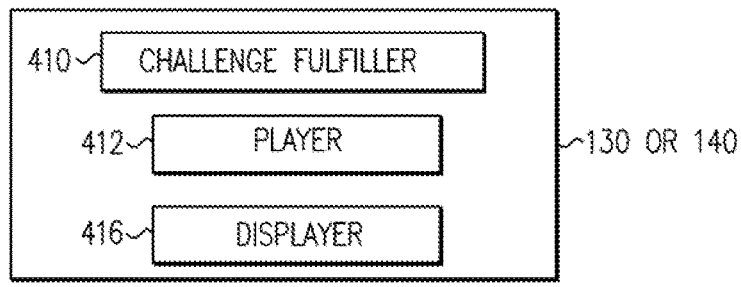
FIG. 4 is a functional block diagram of a user device or pseudo user device, in accordance with some embodiments of the presently disclosed subject matter.

FIG. 4 is a block diagram of user device 130 or pseudo user device 140, in accordance with some embodiments of the presently disclosed subject matter. For simplicity's sake, device 130 or 140 is referred to herein in the single form. However, it is possible that a plurality of devices 130 and/or 140 may collectively perform the operations ascribed herein to device 130 or 140. Therefore reference to device 130 or 140 in the single form, should be construed as covering embodiments where a single device 130 or 140 performs these operations, or a plurality of devices 130 and/or 140 perform these operations.

In the illustrated embodiments, device 130 or 140 may include a challenge fulfiller 410 operative to fulfill the challenge, e.g. as described below with reference to stage 808 and/or 812 of FIG. 8. Device 130 or 140 may also include a player 412, operative to play video included in second content. The type of player which may be used to play the video is not limited. However, for the sake of further illustration, some examples are now provided. Examples of commercially available players may include Adobe Flash player, VLC Media Player, Windows Media Player, KMPlayer, BSPlayer, Silverlight, Chromecast, Roku, browser/HTML5, etc. In examples, where a player may be associated with a browser, certain players may have browser plug in versions and non-plug-in versions (e.g. where the browser instead calls the player), whereas others may have only a plug-in or non-plug-in version. The player that is used may or may not depend on the type of user device 130/pseudo user device 140 (e.g. personal computer, laptop, smartphone, set top box, smart TV, etc.) that is used.

In some embodiments, player 412 may be an emulated player, operative to emulate the playing of the video in order to fulfill the challenge. For example player emulation may occur on user device 130 or 140 in order to prevent the video from being displayed, which may in some cases be more difficult to prevent if an actual player is used. For instance, an ad blocker that may try to emulate the playing, and thereby act as player 412. In some cases of this instance, if the ad blocker runs as a browser plug-in, the ad blocker may be slower, running in java script, compared to some actual players which may run in native code.

In some embodiments, the device shown in FIG. 4 may include a displayer 416 operative to provide video for display to a user, e.g. on a display embedded in user device 130 or on a separate display. For instance, the device shown in FIG. 4 may include displayer 416 if the device is user device 130. As mentioned above user device 130 may not necessarily provide a video for display even though operative to do so (e.g. due to displayer 416). In another instance, the device shown in FIG. 4 may exclude displayer 416 if the device is pseudo device 140.

Figure 5:
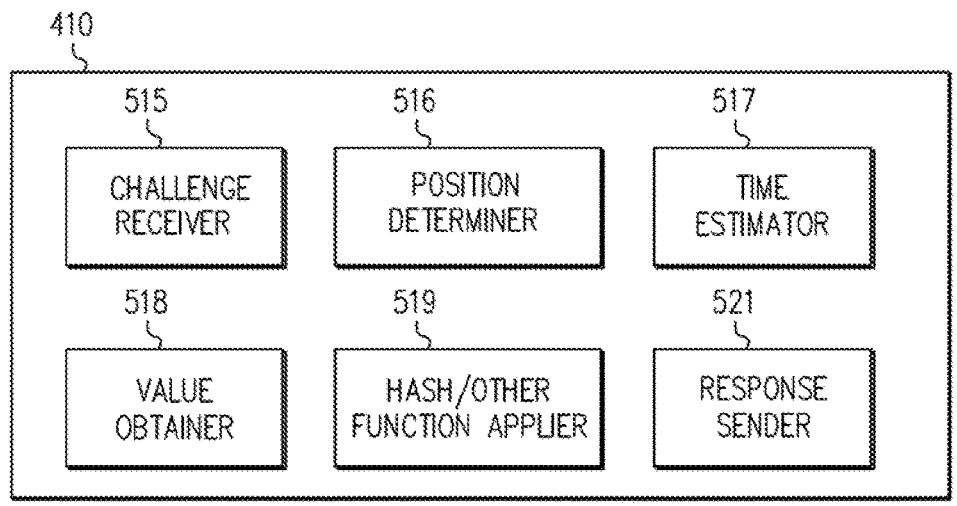
FIG. 5 is a block diagram of a challenger fulfiller module in the user device or pseudo user device of FIG. 4, in accordance with some embodiments of the presently disclosed subject matter.

FIG. 5 is a block diagram of challenge fulfiller 410, in accordance with some embodiments of the presently disclosed subject matter. In the illustrated embodiments, challenge fulfiller 410 may include a challenge receiver 515 operative to receive a challenge, a value obtainer 518 operative to obtain values of pixels associated with certain position(s) in a video, and a response sender 521 operative to send a response to the challenge. In the illustrated embodiments, challenge fulfiller 410 may also include any of the following optional modules: a position determiner 516 operative to convert relative positions to absolute positions and/or to determine positions by applying a hash function and/or other function(s) (in conjunction with hash/other function applier 519), a time estimator 517 operative to estimate elapsed time associated with a given frame, and/or a hash/other function applier 519 operative to apply a hash function such as SHA (e.g. SHA-1, SHA-256, etc.) and/or other function(s).

FIGS. 2 to 5, discussed above, illustrated functional modules. In some embodiments the operations performed by these functional modules may be mapped to software, hardware and/or firmware included in specially constructed and/or specially configured device(s) that include processing capabilities.

Figure 6:
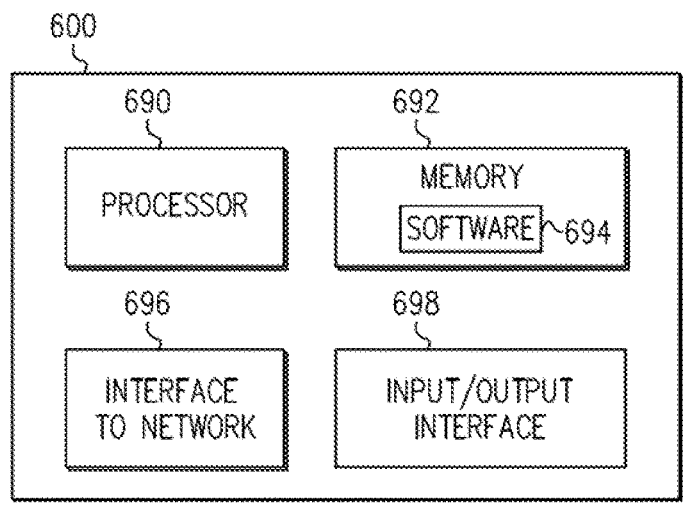
FIG. 6 is a block diagram of a device that includes processing capabilities, in accordance with some embodiments of the presently disclosed subject matter.

Refer to FIG. 6, which is a block diagram of such a device 600 that includes processing capabilities, in accordance with some embodiments of the presently disclosed subject matter. Such a device may be used in some embodiments as any device 120, 130 or 140.

In the illustrated embodiments, device 600 may include processing capabilities by including at least one processor 690. Device 600 may optionally include any of the following: at least one memory 692 that may be a storage medium embodying computer readable program code (shown as software 694), at least one interface 696 to network(s) 150, and/or at least one input and/or output interface 698.

Memory 692, if included, may be included in and/or external to processor 690. In some embodiments, processor 690 may execute software 694 in memory 692 in order to perform operations in accordance with the presently disclosed subject matter, and optionally unrelated operations. Memory 692 may additionally or alternatively include stored data for the presently disclosed subject matter and optionally other stored data.

Interface 696, if included may be operative to send and/or receive communications via one or more network(s) 150. For instance, network(s) may include any network example(s) discussed above. For instance, the communication(s) may include any of the following inter-alia: transmission/receipt of request to access first content, transmission/receipt of challenge fulfillment functionality, transmission/receipt of second content, transmission/receipt of challenge, transmission/receipt of challenge response, transmission/receipt of first content, etc.

Input/output interface 698 when included, may be operative to interface with any type of input device such as a keyboard, mouse, microphone etc., any type of output device (such as a TV screen, monitor, other type of display, speaker, etc.) and/or any type of integrated input/output device such as a touchscreen. The input/output device(s) may be embedded in device 600 and/or separate from device 600 but operatively (wireless and/or wired) coupled to device 600.

For example, operations attributed herein to challenger 252 (FIG. 2), content provider 254 (FIG. 2), fulfillment provider 256 (FIG. 2), content indexer 258 (FIG. 2), challenge generator 360 (FIG. 3), position generator 362 (FIG. 3), challenge storer 364 (FIG. 3), challenge sender 366 (FIG. 3), signature generator 378 (FIG. 3), timer 380 (FIG. 3), ID handler 382 (FIG. 3), response validator 370 (FIG. 3), value determiner 372 (FIG. 3), comparer 374 (FIG. 3), position determiner 375 (FIG. 3), hash/other function applier 376 (FIG. 3), action performer 386 (FIG. 3), response receiver 384 (FIG. 3), challenge fulfiller 410 (FIG. 4), player 412 (FIG. 4), displayer 416 (FIG. 4), challenge receiver 515 (FIG. 5), response sender 521 (FIG. 5), position determiner 516 (FIG. 5), time estimator 517 (FIG. 5), value obtainer 518 (FIG. 5), and/or hash/other function applier 519 (FIG. 5), may be performed by processor 690 alone, and/or may be performed by processor 690 in cooperation with any of: memory 692, interface 696 and/or input/output interface 698.

Figure 7:
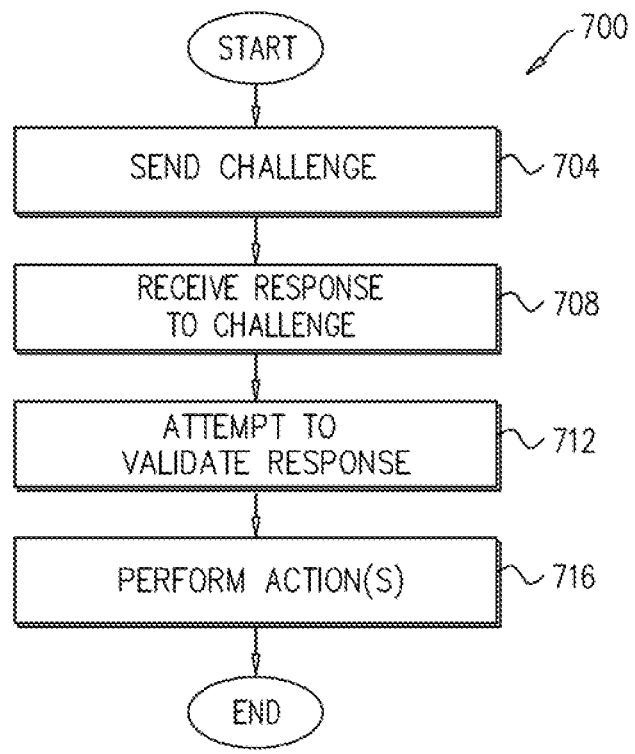
FIG. 7 is a flowchart of a method of supporting conditional content access, in accordance with some embodiments of the presently disclosed subject matter.

FIG. 7 is a flowchart of a method 700 of supporting conditional content access), in accordance with some embodiments of the presently disclosed subject matter. In some embodiments, method 700 may be performed by validating supporting device 120, which is at least operative to validate a response to a challenge relating to digital video included in second content.

In the illustrated embodiments, in stage 704, in response to a request of user device 130 to access first content, validating supporting device 120 may send a challenge, relating to digital video included in second content. Although the challenge may be sent to user device 130, the challenge may not necessarily reach user device 130, but may be intercepted by pseudo user device 140; may be received and attempted to be fulfilled by user device 130; or may be received by user device 130 and passed onto pseudo user device 140.

In some embodiments, a request from user device 130 to access first content may have been received by validating supporting device 120 or by any other supporting device 120. The request may have been in any format. For instance, access to the first content may have been requested by a browser on user device 130 sending a uniform resource locator (URL) for the first content. The first content may be complete content or a section of complete content. If the first content is a section of complete content, then the request by user device 130 to access first content may have been solely for the first content or may have been inherent in a request to access the complete content. In the latter case, and assuming successful validation of a response to a challenge relating to video included in second content is required before user device 130 may access the first content, other section(s) of the complete content (such as different section (a) of a TV show, different section(s) of an application, different section(s) of content on a website, etc.) may or may not be accessible to user device 130, if the response to the challenge is not successfully validated.

In some embodiments, in response to the request, it may be determined whether or not it is acceptable that the first content be accessed without prior playing of video. The determination may be performed for example by one or more supporting device(s) 120. For example, the determination may be made by supporting device 120 which is operative to provide the first content. It may be possible that it is acceptable that certain first content may be accessed without prior video playing. If the determination is that access to the first content is acceptable without prior playing of video, then in these embodiments the first content may be provided to user device 130 in response to the request, and method 700 need not be performed.

In these embodiments, if the determination is instead that access to the first content is not acceptable without prior playing of video included in second content, then method 700 may be performed. Any supporting device 120 may send the second content to user device 130, e.g. if the second content is not already on device 130 or 140 that will be receiving the challenge. For example, if validating supporting device 120 is not operative to provide second content, then the particular supporting device 120 that is operative to provide second content may send the second content to user device 120, or to validating supporting device 120 for forwarding to user device 130. Although the second content may be sent to user device 130, the second content (or at least the included video) may not necessarily reach user device 130, but may be intercepted by pseudo user device 140; may be received and kept by user device 130; or may be received by user device 130 and passed onto pseudo user device 140. In some cases, the entire second content, or at least all the video included in the second content, may be sent prior to the start of the video playing. In some other cases the video playing may begin before the entire second content, or all the video included in the second content is sent.

In some other embodiments, such a determination of whether or not it is acceptable that the first content be accessed without prior playing of video may not be made, or method 700 may be performed regardless of the outcome of the determination.

In some embodiments, there may be a determination of whether or not the device which may be receiving the challenge (e.g. 130 or 140) is operative to fulfill the challenge. In other words there may be a determination of whether or not the receiving device already has the complete challenge fulfiller 410 for handling the challenge, or is missing at least some challenge fulfillment functionality. For example, assume for simplicity's sake that device 130 or 140 includes the required hardware and/or firmware of challenge fulfiller 410, but may not necessarily include all of the software required for challenge fulfiller 410. For instance, software that may be missing may include computer readable program code which when executed may cause device 130 or 140 to fulfill the challenge (e.g. to perform stages 808-812 of method 800 to be discussed below). Therefore, in this example, supporting device 120 which made the determination (e.g. validating supporting device 120) may send or cause to be sent to device 130 or 140, or direct device 130 or 140 to, computer readable program code which when executed may cause device 130 or 140 to fulfill the challenge. In order to distinguish this software from other software, this software may be referred to herein as "stages" software. Stages software may include, for instance, script(s) (e.g. JavaScript(s)) or similar that may be executed in a browser or otherwise executed by device 130 or 140.

In some embodiments where a determination is made regarding whether or not challenge fulfiller 410 is already complete, the determination may include any supporting device 120 (e.g. validating supporting device 120) sending requirement(s) (e.g. required script(s) or similar) for challenge fulfillment that may not already be on device 130 or 140 which is receiving the challenge. The requirements may be sent separately, or may not be sent separately, but rather may be included in the second content. For instance, if the second content is a webpage, the webpage may include references to any required scripts. Device 130 or 140 may answer regarding which requirement(s) device 130 or 140 already has or does not have. The determination may further include supporting device 120 (e.g. validating supporting device 120) determining based on the answer whether challenge fulfiller 410 is or is not complete on device 130 or 140 which is receiving the challenge. If not, supporting device 120 which made the determination may send or cause to be sent missing challenge fulfillment functionality (e.g. the stages software), or direct device 130 or 140 to a location where the missing challenge fulfillment functionality is located. For instance, device 130 or 140 may access the missing challenge functionality by way of fulfiller provider supporting device 120, which may be separate from validating supporting device 120, or fulfiller provider 256, which may be included in validating supporting device 120, sending the missing challenge fulfillment functionality to device 130 or 140. Additionally or alternatively, device 130 or 140 may access the missing challenge fulfillment functionality by being directed to fulfiller provider supporting device 120 or to fulfiller provider 256.

In embodiments where a determination is made regarding whether or not challenge fulfiller 410 is already complete, the subject matter does not limit when the determination may occur. For example, the determination may be made before the (current) challenge is sent in stage 704, at any time before stage 808 (FIG. 8) is performed, only if this is the first time that any challenge is being sent to device 130 or 140 that is receiving the current challenge, etc.

In some other embodiments, a determination of whether or not challenge fulfiller 410 is already complete may not necessarily be made, for instance because it may be assumed that challenge fulfiller 410 is already complete on device 130 or 140 that is receiving the challenge.

In some embodiments, the second content may be sent after the request for access to the first content has been made by user device 130. The second content may be sent together with the challenge, or separately from the challenge, e.g. by content provider 258 of validating supporting device 120, or by another supporting device 120 which is operative to provide the second content. For example the second content may be sent separately from the challenge by being sent before, after, by a different supporting device 120, etc. In some other embodiments, the second content may already be on device 130 or 140 which is receiving the challenge, before the request for first content is made by user device 130.

The manner in which the challenge may be sent is not limited. However, for the sake of illustration, some examples are now given. For example, if the second content is a webpage which includes a video object, it is possible that the challenge may also be included in the webpage, e.g. as an HTML, element. As another example, a challenge may be requested by an AJAX call, and subsequently the challenge may be sent via an Application Programming Interface (API) in response to the AJAX call. As another example, the challenge may be sent along with (missing) challenge fulfillment functionality (e.g. may be included in stages software).

The data included in the challenge and the format of the challenge are not limited. The challenge may include any data and have any format that may be appropriate for device 130 or 140 which receives the challenge and which includes or will include challenge fulfiller 410, to be able to fulfill the challenge (e.g. by performing stages 808 and 812 described below). However for the sake of further illustration some examples of a challenge are now provided.

For example, the challenge that is sent may be at least indicative of positions that include a plurality of frames, meaning that not all the indicated positions relate to a single frame. Rather one or more indicated positions may relate to the same frame. (The term frame as used herein is a synonym for image.) The manner in which the challenge may be indicative of positions is not limited, but for the sake of further illustration, some examples are now provided.

For example, the challenge may be indicative of a position by specifying the frame and/or positioning in the frame. Positioning in a frame may refer to absolute positioning in a frame, e.g. x, y coordinates in the frame. Additionally or alternatively, positioning may refer to relative positioning in the frame. For instance, the relative positioning may be specified in percentages: e.g. if the position relates to a pixel that is the $150^{th}$ out of 300 in the x direction, as well as the $400^{th}$ out of 500 in the y direction, then the specified percentages may be 50% (i.e. 150/300) and 80% (i.e. 400/500). The relative positioning may be converted into absolute positioning, e.g. based on the video dimensions.

In another example, the challenge may be indicative of position(s) by additionally or alternatively including certain data which when hashed, and/or another function applied, by device 130 or 140 which is fulfilling the challenge, may result in the position(s). The implementation of this example may vary, but for the sake of further illustration some instances are described below with reference to stage 808 (FIG. 8).

Both of the latter two examples may be considered examples of explicit indication of frames and/or positioning. In another example, being indicative of a position may additionally or alternatively include being implicitly indicative of a frame and/or positioning within the frame. For instance, frame(s) may be considered to be implicitly indicated if explicitly indicated positioning is understood to refer to the same positioning in each of the frames of the video. The positioning in certain frames may, for instance, be considered to be implicitly indicated if the frames are explicitly indicated, the positioning for one or more of these frames is explicitly indicated, and it is understood that the positioning in the remainder of these frames is the same as the positioning explicitly indicated for the one or more of the frames. Therefore when it is stated that the challenge may be indicative of positions that include a plurality of frames, it should be understood that not all the plurality of frames may necessarily be explicitly indicated, e.g. if one, some, or all of the plurality of frames are implicit.

The number of positions which may be indicated by the challenge is not limited, but for the sake of further illustration some examples are now provided.

For example, the quantity of positions (or percentage of positions in the video) indicated by the challenge may be required to exceed a minimum (or a minimum percentage) so as to increase the difficulty of the challenge. In another example, the quantity of positions (or percentage of positions in the video) may additionally or alternatively be required to not exceed a maximum (or a maximum percentage) so as to not exhaust all positions in the video in a low number of challenges that may be sent for the video and enable receiving device 130 or 140 to benefit from previous responses (by the same or different device) to challenges, when responding to the current challenge. In another example, there may not be a minimum or maximum.

For another example, regarding the plurality of frames included in the positions, the quantity of frames constituting the plurality of frames indicated by the challenge may vary depending on the embodiment. Depending on the embodiment, there may or may not be a minimum and/or a maximum quantity of frames allowable.

The subject matter also does not limit which positions may be indicated by the challenge, but for the sake of further illustration some examples are now provided.

For example, which frames are included in the plurality of frames may vary. The plurality of frames, for instance, may or may not include at least one frame which is toward the end of the video, e.g. from among the last five percent of frames that would be played in the video, so as to attempt to ensure playing of the entire video. Additionally or alternatively for instance, the plurality of frames may or may not include at least one frame from, say, every decile of frames (e.g. at least one frame from first 10%, at least one frame from second 10%, etc.) of the video. Such dispersion of frames may make it less worthwhile for device 130 or 140 that receives the challenge to search for the individual frames without the entire video being played. Assuming that it is required that at least one frame be from among the last five percent of the frames and/or from every decile, validating supporting device 120 may be operative to determine the quantity of frames in the video included in the second content, in order to determine which frames are among the last five percent, and/or which frames are in the various deciles of the frames in the video. In some cases of this instance, validating supporting device 120 may be operative to quantity the number of frames in the video by indexing the video (see discussion below), or by receiving a specification of the quantity of frames in the video, e.g. from the video producer.

Additionally or alternatively for example, with respect to indicated positions, the challenge may or may not need to be different from the most recently sent (other) challenge relating to the video (if such a challenge was previously sent). Continuing with this example, if the challenge may need to be different then at least one of the positions indicated by the challenge, for instance, may need to be different from any position indicated by the most recently sent (other) challenge relating to the video. If indicated positions may vary for different challenges relating to the same video, it may be more difficult for device 130 or 140 which receives the challenge to benefit from previous responses to challenges relating to the same video (by the same or different device), when responding to the current challenge.

For example, additionally or alternatively, it may be advantageous in some embodiments if device 130 or 140 that receives the challenge is not aware of the positions that will be indicated by the challenge prior to receiving the challenge. Otherwise, receiving device 130 or 140 may benefit from previous playing of the video (by the same or different device) when values of pixels associated with these positions may have been obtained, and the video may not need to be played after the challenge is received in order to respond to the challenge. For instance, in some of these embodiments the positions may not be provided to device 130 or 140 (separately from the challenge) and may not be easily reproduced by receiving device 130 or 140, e.g. from earlier challenges, if any, relating to the video.

Continuing with examples of the challenge, in various embodiments the challenge may or may not be indicative of any of the following: time, identity of second content, identity of first content, identity of challenge, or signature. Additionally or alternatively, the challenge may or may not be indicative of other feature(s). For instance, the challenge may or may not be indicative of identity of user device 130 which requested the first content, identity of session etc.

If the challenge is indicative of the identity of first content and/or identity of second content, the challenge may, for instance, be indicative of the identity of first content and/or identity of second content by including a first content identifier and/or a second content identifier. The first content identifier may be any identifier which may allow identification of the first content. The second content identifier may be any identifier which may allow identification of the second content. For instance, the first content identifier may be an identifier that was used by user device 130 when requesting access to the first content (e.g. a URL), an identifier generated by supporting device 120 which is operative to provide the first content, an identifier generated by validating supporting device 120, an identifier generated by validating supporting device 120 which is also operative to provide the first content, or an identifier generated by any supporting device 120 and used by user device 130 when requesting access to the first content. For instance, the second content identifier may be an identifier generated by supporting device 120 which is operative to provide the second content in order to identify the second content, may be an identifier generated by validating supporting device 120, or may be an identifier generated by validating supporting device 120 which is also operative to provide the second content. For simplicity's sake it is assumed that the second content identifier may also function as an identifier of the video included in the second content.

If the challenge is indicative of time, the challenge may, for instance, be indicative of time by including a time stamp. The subject matter does not limit the time stamp which may show any appropriate time, but for the sake of further illustration some examples are now given. For example, the time stamp may show the time that the challenge is generated by validating supporting device 120, the time that the challenge is sent by validating supporting device 120, the time that the request for access to first content was received, etc.

If the challenge is indicative of a signature, the challenge may, for instance be indicative of the signature by including the signature. For instance, the signature may be a signature generated by validating supporting device 120 using any appropriate technique. The technique used for generating the signature is not limited, but for the sake of further illustration an example may include the signature being generated in accordance with the RSA, e.g. by using a private key of validating supporting device 120.

Validating supporting device 120 may or may not store at least part of the challenge that is transmitted. For instance, in some embodiments, validating supporting device 120 may store indication(s) of any of the following: positions, identity of challenge, time, identity of second content, identity of first content, etc., indicated by the challenge. In some of these embodiments where at least part of the challenge is stored, validating supporting device 120 may store the indication(s) in a manner which enables finding the stored data during stage 712, to be described below. For example, the data may be cross referenced to an identity of the challenge, or in other words to a challenge identifier, so that if the response received in stage 708 includes the challenge identifier, validating supporting device 120 may access the data. In some cases only data from the last sent challenge may be accessed, whereas in other cases data from any of more than one sent challenges may be accessed, e.g. if validating supporting device 120 may identify the response received as relating to a particular sent challenge. Validating supporting device 120 may or may not store data relating to the transmitted challenge that is not included in the transmitted challenge. For example, validating supporting device 120 may or may not store values of pixels in the video associated with the indicated positions.

In embodiments which include storing, the duration of storage may vary. For example, the at least part of the challenge and/or data relating to the challenge that is stored, may be stored for a limited time duration, based on the expected time for receiving a response to the challenge. In this example, once the limited time duration has expired, validating supporting device 120 may no longer be able to access the (previously stored) at least part of the challenge and/or data relating to the challenge and therefore may not be able to successfully validate a response received to this challenge. In some other examples, the duration if storage may not be based on the expected time for receiving the response.

In the illustrated embodiments in stage 708, validating supporting device 120 may receive a response to the challenge. The response may be at least indicative of values.

The indicated values, for example, may presumably be of pixels associated with positions indicated in at least one of: the challenge or the response. The values may be considered to only "presumably" be of pixels associated with positions indicated in at least one of the challenge or the response, because it may be possible that the values may not in actuality be of pixels associated with these positions. For instance, if device 130 or 140 did not properly fulfill the challenge (e.g. did not play the video but just "made up" values), the values may not in actuality be of pixels associated with these positions. Whether or not the presumption is correct may be determined, e.g. during the attempt at validating the response in stage 712, to be described below.

A pixel may be the smallest controllable element of a frame. Typically although not necessarily, the size of a pixel may vary depending on the resolution of the frame. The type of value of a pixel is not limited, but for the sake of further illustration some examples are now provided. For example, the value of a pixel may or may not be a value which may affect display at a position associated with the pixel, if the video is displayed, such as brightness/intensity (e.g. black/white, greyscale level, etc.), color (e.g. vector of three numbers representing red, green and blue components, a vector of more than three numbers representing more components, etc.), etc.

In some cases where the indicated values may affect display of the video, the video that is sent may advantageously not need to be adapted in order to be used for the challenge, from what would have be sent if there were no challenge. In some other cases where the indicated values may affect display of the video the video may be adapted in order to be used for the challenge, but after adaptation the values may typically although not necessarily affect display without negatively impacting on the viewing pleasure of the user.

The manner that the response may be indicative of the values is not limited, but for the sake of further illustration, some examples are now provided. For example, the response may be indicative of a value, by specifying the value. In another example, the response may be indicative of at least one of the values by additionally or alternatively including a hash value resulting from applying a hash function to (or in other words hashing) the at least one of the values. In another example, the response may be indicative of at least one of the values by additionally or alternatively including a value resulting from applying another function to the at least one of the values. A hash function that may be used may be any hash function.

In another example, the response may be indicative of a plurality of values by additionally or alternatively including a (calculated) value that may be calculated based on a generated histogram of the plurality of values. This example will be described in more detail below with reference to FIG. 8.

In some embodiments, assuming that the video is played, the values which are indicated by the response may be values of pixels associated with positions indicated by the challenge sent in stage 704. However, in some other embodiments this may not necessarily be the case, even if the video has been played. For example, as will be described in more detail below with reference to method 800 (FIG. 8), it is possible that device (130 or 140) responding to the challenge may not be operative to necessarily obtain a value of a pixel associated with the actual frame indicated by the challenge due to technical limitations. Therefore in some of these other embodiments, for instance, the values which are indicated by the response may be values of pixels associated with positions that may not necessarily have been indicated in the challenge sent in stage 704. In this instance, positions may be indicated by the response due to the possibility that the positions associated with the indicated values may not be the same as those indicated by the challenge. However in other instance, positions may be indicated in the response regardless of whether there exists such a possibility, for instance because the response may include a copy of the challenge, or for the convenience of validating supporting device 120. It is noted that if the challenge is included in the response and the response is also separately indicative of positions associated with the indicated values, the separately indicated positions may or may not be the same as the positions indicated by the included challenge.

In embodiments where the response may be indicative of positions, the subject matter does not limit the manner that the response may be indicative of positions. Examples provided above regarding the manner that the challenge may be indicative of positions may be applicable to the response, mutatis mutandis.

In some embodiments, the response may include the data included in the challenge or a part thereof. For example, the response may include indication(s) of any of: positions, time, identity of second content (i.e. second content identifier), identity of first content (i.e. first content identifier), challenge identifier, signature, identity of user device (i.e. user device identifier), identity of session (i.e. session identifier), etc. that would have been indicated by the challenge sent in stage 704. In some of these embodiments, what is indicated or not indicated by the response may depend on the implementation, such as on which data, if any, was stored regarding the challenge by any supporting device 120, how validating supporting device 120 is to attempt to validate the response, etc.

In the illustrated embodiments, in stage 712, validating supporting device 120 may attempt to validate the response received in stage 708. The attempt at validation of the response may include determining values of pixels in the video that are associated with positions indicated by at least one of: the challenge or the response and comparing the values indicated by the response, or a function thereof, to the determined values, or a function thereof.

In some of these embodiments when a function of values is compared, the function of the values may be fewer in quantity, larger in quantity, or the same quantity as the values. In some of these embodiments, when a function of the values is compared, the function of the values may result from one or more applied functions, e.g. the same function applied to all the values, different functions applied to different values possibly including a function that does not change some of the values (such as multiplying by 1), etc. In some of these embodiments, the indicated values or a function thereof may be compared to the determined values, or a function thereof, in order to evaluate whether the presumption that the indicated values are of pixels associated with positions indicated by at least one of the challenge or the response, is actually correct.

Validating supporting device 120 may determine values, in any manner. However, for the sake of illustration some examples are now provided.

For example, validating supporting device 120 may determine values by playing the video. In this example, validating supporting device 120 may be operative to play the video in order to determine the values of the pixels associated with the positions indicated by at least one of: the challenge or the response.

In another example, validating supporting device 120 may determine values by additionally or alternatively accessing stored values. For instance, validating supporting device (or another supporting device 120) may have generated an index of the video (or in other words indexed the video), storing the values of all pixels in the video by position, e.g. with each value of a pixel cross referenced to the position of the pixel. In this example, validating supporting device 120 may be operative to access the index in order to determine of values of the pixels associated with the positions indicated by at least one of: the challenge or the response.

In either of the latter two examples, validating supporting device 120 may be operative to determine which video is relevant and which positions are (presumably) associated with the values indicated by the response. The positions which are (presumably) associated with the values indicated by the response may be positions indicated by at least one of the challenge or the response. For instance, validating supporting device 120 may have stored indication(s) of the video (e.g. identifier of second content), and/or the positions indicated by the challenge, e.g. by challenge identifier. The response, in this instance, may be indicative of the challenge identifier and optionally of positions. In another instance, the response may include (a copy) of the challenge (or at least be indicative of positions indicated by the challenge and of identity of the video such as an identifier of second content) and optionally the response may also be indicative, separately from the challenge, of positions. In some cases of these instances, the response may be indicative, separately from the challenge, of positions, only if these positions are not all the same as indicated by the challenge, or even if all the positions are the same as indicated by the challenge.

In another example where the values indicated by the response may be presumed to be of pixels associated with positions that are at least indicated by the challenge, the values of the pixels at these positions may have been stored around the time that the challenge was sent and validating supporting device 120 may be additionally or alternatively be operative to determine these values by retrieval of these values. For instance, validating supporting device 120 may have stored the values referenced to the challenge identifier. In this instance, the response may include the challenge identifier which may enable validating supporting device 120 to retrieve the stored values.

In another example, validating supporting device 120 may additionally or alternatively determine values by playing the video, if this is the first time that a challenge had been sent for this video, and may also index the video, so that in subsequent challenges, validating supporting device 120 may determine the values by accessing the indexed values.

The manner of comparison of the indicated values or a function thereof, to the determined values, or a function thereof is not limited, but for the sake of further illustration, some examples are now provided.

For example, the response may be indicative of the values by including the values. These values, or a function thereof, may be compared to the determined values, or a function thereof, where the function is not limited. For instance, a hash function, and/or any other function, may be performed on values included in the response and on determined values, and the resultant hash or otherwise resultant values may be compared.

As another example, the response may be additionally or alternatively indicative of at least one value by including a hash value (resulting from applying a hash function to the at least one value). Value(s) may have been hashed, for example, in order to reduce the size of the response that is transmitted to validating supporting device 120. In some cases of this example, validating supporting device 120 may be operative to perform a hash function on one or more values that validating supporting device 120 determined, thereby obtaining hash (determined) value(s). Validating supporting device 120 may be operative to then compare the hash value(s) included in the response to the hash determined value(s).

As another example, the response may be additionally or alternatively indicative of a plurality of values by including a calculated value that was calculated based on a histogram of the plurality of values. In some cases of this example, validating supporting device 120 may be operative to calculate a calculated (determined value) based on a histogram of a plurality of values that validating supporting device 120 determined. Validating supporting device 120 may be operative to then compare the calculated value included in the response to the calculated determined value.

The subject matter does not limit when the comparison of values, or function(s) thereof, may be successful or not. However for the sake of illustration, some examples are now provided. For example, the comparison of values may be successful if all of the indicated values match the corresponding determined values, or the functions of the corresponding values match; if a certain percentage, say 90%, match; if for all positions the indicated and determined values, or functions thereof, for the same position are within a certain range, say within 2%, of one another, etc.

In some embodiments, the attempt to validate the response may be successful, as long the comparison of values, or function(s) thereof by validating supporting device 120 is successful. In some other embodiments, the attempt at validation may include other act(s) besides comparison of values or function(s) thereof, and therefore validating supporting device 120 may be operative to perform the other act(s) during the attempt to validate the response. The subject matter does not limit the other act(s) but for the sake of further illustration, some examples are now provided.

For example, as mentioned above the response may be indicative of positions. The positions indicated by the response may possibly differ from the positions indicated by the challenge sent in stage 704 (even if device 130 or 140 performs operations in an attempt to properly fulfill the challenge). For instance device 130 or 140 may not be operative to necessarily obtain a value of a pixel in a frame indicated by the challenge due to technical limitations, as will be discussed in more detail below. Therefore in this example, during the attempt to validate the response, validating supporting device 120 may be operative to compare the positions indicated by the response (termed herein for convenience sake "first positions"), or a function thereof, to the positions indicated by the challenge (termed herein for convenience sake "second positions"), or a function thereof. In some cases of this example when a function of the positions is compared, the function of the positions may be fewer in quantity, larger in quantity, or the same quantity as the positions. In some of these embodiments, when a function of the positions is compared, the function of the positions may result from one or more applied function(s), e.g. the same function applied to all the positions, different functions applied to different positions possibly including a function which does not change some of the positions (such as multiplying by 1), etc.

In some embodiments, the response may be indicative of positions indicated by a challenge (e.g. by including a copy of a challenge), as well as separately indicative of positions which may or may not all necessarily be the same as those indicated by the challenge. Validating supporting device 120 may examine the response for the separately indicated positions and compare these positions, or a function thereof, to the positions indicated by the challenge (and also indicated by the response), or a function thereof. In some other embodiments, additionally or alternatively, validating supporting device 120 may access the positions indicated by the challenge which may have been previously stored for the challenge e.g. referenced to a challenge identifier, and compare the stored positions, or a function thereof, to positions indicated by the response, or a function thereof, regardless of whether a copy of the challenge is included in the response.

The subject matter does not limit when the comparison of positions, or function(s) thereof, may be successful or not. However for the sake of further illustration, some instances are now provided.

For instance, the comparison of positions may be successful if all of the positions and/or function(s) match completely (e.g. matching due to same frame, same positioning within frame), if 90% of the positions and/or function(s) match, etc.

Additionally or alternatively, for instance, a position or group of positions indicated by the response (also referred to as a first position or group of positions from among first positions) may be successfully compared to a position or group of positions indicated by the challenge (also referred to as a second position or group of positions from among second positions), if a (first) frame of the first position or group of positions is within a predetermined range that includes a (second) frame of the second position or group of positions and positioning within the first and second frames is identical. Continuing with this instance, if the frame indicated by the challenge is 80, and the positioning within the frame is indicated by x=0, y=77, then the comparison may be successful, say, if the position indicated by the response is indicative of x=0, y=77, and of frame 80 or any other frame within the range of 80±25 (e.g. 55 to 105). This example may allow a certain amount of fuzziness with respect to frames. In some cases of this instance, successful comparison of all positions may require successful comparison of each position or group of positions from among the positions indicated by the response to a respective position or groups of positions indicated by the challenge. Similarly, a comparison which includes function(s) of the positions may be successful provided that fuzziness with respect to frames, if any, does not exceed a certain amount.

In other examples of other act(s), the attempt to validate the response may include validating supporting device 120 checking, in some embodiments, at least one of: a time indicated by the challenge or a signature included in the response.

In some of these embodiments, validating supporting device 120 may check the time indicated by the challenge ("challenge time") and compare the "challenge time", or a function thereof, to a time associated with the response ("response time"), or a function thereof. For example, response time may be the time the response was generated by device 130 or 140 that generated the response, the time that the response was received by validating supporting device 120, the time that an attempt to validate the response is being made (e.g. current time) by validating supporting device 120, etc. Validating supporting device 120 may determine the challenge time, e.g. by accessing a stored time if the time was stored (e.g. stored with reference to challenge identifier, and the response includes the challenge identifier), and/or by examining the response, if the response is indicative of the challenge time (e.g. by including the challenge, or at least a time stamp that was included in the challenge).

The subject matter does not limit when the comparison of the response time, or a function thereof to the challenge time, or a function thereof may be successful or not. However for the sake of further illustration, some examples are now provided. For example, the comparison may be successful if the response time is not too close to the challenge time and/or if the response time is not too much later than the challenge time. In this example, a response time too close to the challenge time, and/or a response time that is too much later than the challenge time may be suspect. The subject matter does not limit what may be considered "too close" or "too much later" and minimums or maximums may vary depending on the instance. For instance, the response time may be considered too close if the difference between the response time and the challenge time is less than a minimum time to play all of the video. In another instance relevant to when video playing may begin before the entire second content (or all the video in the second content) is sent, the response time may additionally or alternatively be considered to be too close, e.g. if the difference between the response time and the challenge time is less than the amount of time that the challenge time precedes the end of transmission of the second content, or video (meaning that the response time occurs before the ending time of transmission of the second content, or video). In some cases where the response time is considered too close, validating supporting device 120 may flag the comparison due to the possibility that the video was not actually played and that the values included in the response may have been obtained without the video being played.

In some instances of this example, the response time may be considered to be too much later, if not within a few minutes of the challenge time. For instance, assume that validating supporting device 120 examines the response in order to obtain the challenge time because the response is indicative of the time indicated by the challenge, or in order to obtain a challenge identifier and thereby access a stored time, if still stored. However, it is possible that when generating the response, device 130 or 140 may use an older challenge and not the challenge sent in stage 704. In this case, the response may be indicative of the time indicated by the older challenge, or the challenge identifier indicated in the response may relate to an older challenge, and the response time may therefore be "too much later". Validating supporting device 120 may therefore flag the comparison. In this example, it may be desirable to ascertain that the positions and/or the challenge identifier in fact relate to the challenge sent in stage 704, and not for instance to a challenge which may have been sent earlier on, or may not have been sent by validating supporting device 120. For instance, it may be desirable to check the challenge time and/or to check the signature included in the response. The challenge time may be checked against the response time, for instance, in order to verify that the response time is not too much later e.g. that the challenge time and response time are within a few minutes of one another. The signature may be checked, for instance in order to verify that the challenge included in the response was generated by validating supporting device 120.

In another example, in some of these embodiments in addition to or instead of any of the above, for the attempt at validation to be successful it may be desirable to check the challenge time against the response time in order to verify that the challenge time and the response time are not too close to one another.

The attempt to validate the response in stage 712 may or may not be successful.

In the illustrated embodiments, in stage 716, validating supporting device 120 may perform at least one action relating to access to the first content, dependent on whether or not the attempt to validate the response was successful. The at least one action is not limited but for the sake of further illustration, some examples are now provided.

An example of at least one action relating to access to the first content, if the attempt to validate the response was successful, may include validating supporting device 120 sending the first content to user device 130. In some cases of this example, validating supporting device 120 may send the first content only if the attempt to validate the response was successful. In another example, if the attempt to validate the response was successful, validating supporting device 120 may cause the first content to be sent to user device 130 (e.g. by indicating to another supporting device 120 to provide the first content). In some cases of this example, validating supporting device 120 may cause the first content to be sent only if the attempt to validate the response was successful. In another example, validating supporting device 120 may send or cause the first content to be sent, subject to satisfaction of additional condition(s). For instance, additional condition(s) may relate to characteristics of the user, characteristics of the user device, characteristics of the first content, and/or any other characteristics such as age of user if first content is age restricted, suitability for user device 130, etc. In another example, validating supporting device 120 may send or cause the first content to be sent (possibly subject to additional condition(s)), unless user device 130 overrides the sending of the first content. For instance, user device 130 may override the sending, by declining the receipt of the first content, or by canceling the previous request to access the first content even though access is permitted. Continuing with this instance, if the first content relates to a webpage, user device 130 may be considered to have canceled the request to access the first content if a browser on user device 130 had requested in the meantime a different webpage. In another example, validating supporting device 120 may send or cause the first content to be sent possibly subject to additional condition(s), but user device 120 may adjust how the first content may be accessed.

An example of at least one action relating to access to the first content, if the attempt to validate the response was not successful may include validating supporting device 120 not sending or not causing the first content to be sent. In another example of at least one action, validating supporting device 120 may additionally or alternatively repeat stages 704 to 716. A different challenge may be sent, in case device 130 or 140 which is responding to the challenge erred inadvertently. Depending on the embodiment, there may or may not be a limit on how many times the stages may be repeated. In another example of at least one action, validating supporting device 120 may additionally or alternatively send other content. For instance, the other content may explain the reason playing the video is important, the reason that the first content is not being delivered, a warning that although this time the first content is being delivered next time the first content may not be delivered, a warning against trying to pretend that the video was played when it was not, etc. Continuing with the instance regarding the reason the first content is not being delivered, if a promotional content video was not played due to ad-blocking, the other content may include content regarding problems which ad blocking causes (e.g. loss of revenue related to first content).

As mentioned above, in some embodiments the values of the pixels may be obtained by way of playing the video, but may not be obtained just by having access to the video, without the video being played. Therefore the challenge may be advantageous in these embodiments in requiring the playing of the video and not just access to the video (without playing) by user device 130 or pseudo user device 140. It may be possible for the values to be obtained even if the video is not displayed. However, non-display may be less preferable to the user, because the user may still have to wait from the time access to the first content was requested, e.g. until the time the first content is received, and may not benefit from the entertainment of the video. Usage of pseudo device 140, and/or having user device 130 not provide the video for display, may thus be discouraged in these embodiments. The length of the wait by the user may be dependent on when the attempt at validation is determined to be successful.

In accordance with some embodiments, the earliest time that an attempt at validation may be successful, may be dependent on characteristics of the video, characteristics of the transmission of the video, and/or characteristics of the playing. For example, if at least one of the positions indicated by the challenge is from frame(s) closer to the end of the video (e.g. last 5% of frames), device 130 or 140 responding to the challenge may not be able to properly respond before this or these frame(s) are played. Additionally or alternatively, in an example where the video may not be entirely sent before video playing begins, the attempt at validation may not be successful if the response time is before the ending time of transmission of the video. Moreover, in this example device 130 or 140 responding to the challenge may not be able to properly respond to the challenge before the part of the video including the last indicated position has been received by device 130 or 140. Additionally or alternatively, for example, if emulation of playing occurs, the emulation may in some cases take longer and the user may have to wait longer to receive the first content than if the video had been played by an actual (e.g. commercially available) player.

Figure 8:
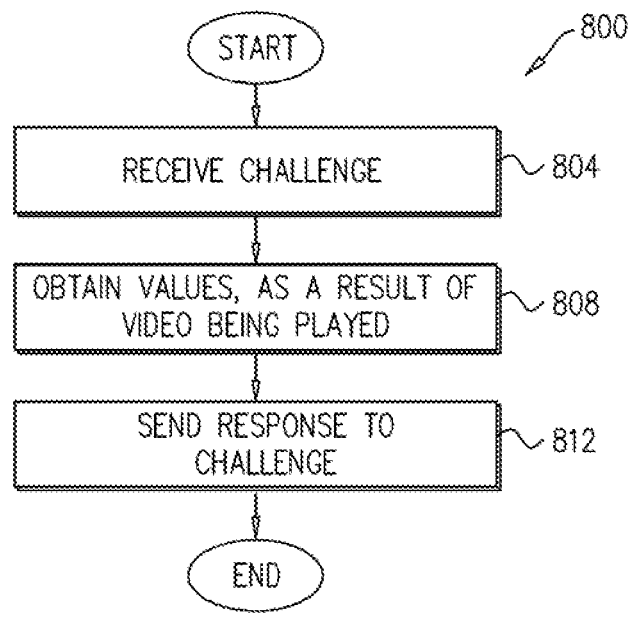
FIG. 8 is a flowchart of a method of responding to a challenge, in accordance with some embodiments of the presently disclosed subject matter.

FIG. 8 illustrates a method 800 of responding to a challenge, in accordance with some embodiments of the presently disclosed subject. Method 800 may be performed by user device 130 or pseudo user device 140, for example by challenge fulfiller 410 on device 130 or 140. Although for simplicity's sake, method 800 is described as being performed by user device 130 or pseudo user device 140, it should be understood to cover embodiments where only user device 130 performs method 800, embodiments where only pseudo user device 140 performs the method, and embodiments where user device 130 and pseudo user device 140 perform the method.

In the illustrated embodiments in stage 804, user device 130 or pseudo user device 140 may receive the challenge that was sent by validating supporting device (see above stage 704). Many of the details that were described above with reference to stage 704 are relevant to stage 804, mutatis mutandis and will not be repeated here. The reader is referred to the description above of stage 704. Some of these details however are also summarized here.

In the illustrated embodiments, the challenge may relate to digital video included in second content. The challenge may have been sent in response to user device 130 requesting first content.

In the illustrated embodiments, the challenge that is received may be at least indicative of positions that include at least a plurality of frames.

In various embodiments, the challenge may or may not be indicative of any of the following: time, identity of second content, identity of first content, identity of challenge or signature. Additionally or alternatively, the challenge may or may not be indicative of other feature(s). For instance, the challenge may or may not be indicative of identity of user device 130 which requested the first content, identity of session etc.

In some embodiments, if challenge fulfiller 410 on device 130 or 140 is not complete, device 130 or 140 may obtain missing challenge fulfillment functionality (e.g. stages software) before performing stage 808. For example, device 130 or 140 may receive computer readable program code for causing a computer (e.g. device 130 or 140) to, as a result of digital video being played, obtain values of pixels in the video that are associated with a plurality of positions including at least one of: one or more of positions indicated by the challenge that was received, or one or more positions not indicated by the challenge. Device 130 or 140 may further receive computer readable program code for causing the computer (e.g. device 130 or 140) to send a response to the challenge, the response at least indicative of obtained values.

In some embodiments, it may be assumed that device 130 or 140 which has access to the video and which receives the challenge may not determine the values of the pixels without the video being played, thereby advantageously requiring the challenge to be fulfilled. For instance, in some of these embodiments the values may not be provided to the device (separately from the video) and may not be easily reproduced by receiving device 130 or 140 if the video is not played.

In some embodiments the positions indicated by the challenge may vary for different challenges relating to the same video and/or device 130 or 140 that receives the challenge may not be aware of the positions that will be indicated by the challenge prior to receiving the challenge. For example, at least one of the positions indicated by the current challenge may need to be different from any position indicated by the most recently sent (other) challenge, if any, relating to the video. In these embodiments receiving device (130 or 140) may not benefit from previous playing of the same video and/or previous responses to challenges relating to the same video (by the same or different device) when responding to the current challenge.

In some embodiments, the quantity of positions (or percentage of positions in the video) indicated by the challenge may exceed a minimum (or a minimum percentage) so as to increase the difficulty of the challenge. In some embodiments, the quantity of positions (or percentage of positions in the video) may additionally or alternatively not exceed a maximum (or maximum percentage) so as to not exhaust all positions in the video in a low number of challenges that may be sent for the same video and enable receiving device 130 or 140 to benefit from previous responses (by the same or different device) to challenges when responding to the current challenge. Additionally or alternatively, in some embodiments, the plurality of frames may include at least one frame from among the last five percent of the frames that would be played in the video, and/or at least one frame from every decile of frames in the video.

In the illustrated embodiments, in stage 808, as a result of the video (included in the second content) being played, device 130 or 140 that is fulfilling the challenge may obtain values of pixels in the video that are associated with a plurality of positions including at least one of: one or more of the positions indicated by the challenge, or one or more positions not indicated by the challenge.

In some embodiments, the video may begin to be played (e.g. by player 412) even if the entire video has not yet been received. For example, the video may begin to be played while the video is being streamed or while being broadcast via a broadcast network. In some other embodiments, the video may not be played until entirely received (e.g. and stored locally).

As mentioned above, the received challenge may be indicative of positions. In some embodiments, the challenge may be indicative of positions by specifying absolute positions (e.g. frame, x, y). In some other embodiments, the challenge may not necessarily specify absolute positions, but may be additionally or alternatively indicative of positions in another manner such as specifying relative positions (e.g. frame, percentage x, percentage y) or by including certain data which when hashed, and/or another function applied, by device 130 or 140 which is responding to the challenge, may result in the positions of the pixels. In these embodiments, device 130 or 140 may determine absolute positions, for instance by converting the relative positions into absolute positions based on the video dimensions, and/or by hashing and/or applying the other function to the included (certain) data. A hash function that may be used may be any hash function. The implementation of the hashing and/or other function application may vary depending on the instance, but for the sake of further illustration some instances are now provided.

For instance, the certain data may be a random seed, and the function may for instance, include pseudo random number generation. Additionally or alternatively, for instance, the certain data may be hashed, and/or another function may be applied in order to determine a particular position (e.g. frame number, x, y coordinates; frame number, percentage x percentage y, etc.). The determined particular position may then be hashed, and/or the other function applied, to determine a later position where the later position may include a later frame than the frame included in the particular position or may include positioning closer to the end of the same frame as the frame included in the particular position. If the challenge relates to more than two positions, then the determining may continue, with the later position being hashed and/or having the other function applied to determine an even later position, etc. Therefore, if the applied function is a hash function, this instance may be considered an ongoing hash. Optionally, the challenge may include an indication of how many positions to determine from the certain data. Additionally or alternatively, for instance, the certain data included in the challenge may be hashed and/or another function may be applied to the data in order to determine all of the positions, rather than sequentially determining the positions. In any of these instances where a hash function may be applied, any hash function may be applied.

In some embodiments, device 130 or 140 may not necessarily be able to specify the frame for an indicated position in order to obtain the value of the pixel associated with that position. For instance, specification of a frame may not be achievable due to technical limitations such as document object module (DOM) application program interface (API) limitations. Assume for example that an HTML5 (or similar) video element (e.g. including the video) may be included in second content. Further assume that a script in challenge fulfiller 410 (e.g. in stages software) may be executed in order to fulfill the challenge. For simplicity's sake, the example will focus on a certain frame that is included in at least one of the positions indicated by the challenge, but it should be understood that the example may be applied to any of the frames indicated by the challenge. In this example, at least part of the operation(s) attributed herein to player 412 may be performed by a browser which may play or assist in playing the video.

In order to cope with the DOM API limitations which may not allow specification of the certain frame in order to obtain at least one value associated with the at least one position, device 130 or 140 may instead estimate the time that is to elapse from the beginning of the video until that frame will be played, based for instance on the frame rate. When the time has elapsed, device 130 or 140 may determine the current frame that is being played, and obtain value(s) of pixel(s) positioned (e.g. x,y) in the current frame in accordance with the at least one position indicated by the challenge. Therefore at least the positioning of this pixel(s) within the current frame may be in accordance with the at least one indicated position, whereas the current frame may or may not be the same as the certain frame. The subject matter does not limit how the values may be obtained in this example, but for further illustration some instances are now provided.

For instance, at least part of the operation(s) attributed herein to challenge fulfiller 410 may be performed by a browser which may run or assist in running the script for fulfilling the challenge regarding the video element in the second content. The browser may, when the estimated time has elapsed, return the current frame (e.g. frame number) that is being played (and possibly being provided to a display), and the value(s) of the pixel(s) positioned (e.g. x, y) in the current frame in accordance with the indicated position(s). In another instance, the browser may, when the estimated time has elapsed, return the current frame (e.g. frame number) that is being played (and possibly being provided to the display) and the values of all the pixels located in the frame. The value(s) of the pixel(s) positioned (e.g. x, y) in the current frame in accordance with the indicated position(s) may then be obtained from among the returned values. In these instances, the actual (current) frame for which the value(s) may be returned may not necessarily be the (certain) frame that was indicated by the challenge. Because the frame(s) may not necessarily be as indicated by the challenge, the plurality of positions that are associated with the pixels for which values are obtained may include at least one of: one or more of the positions indicated by the challenge or one or more positions not indicated by the challenge.

In some embodiments the actual frame for which values are obtained may necessarily be the frame indicated by the challenge (for example because device 130 or 140 may be able to specify the frame for given position(s)). In these embodiments the plurality of positions that are associated with the pixels for which values are obtained may still include at least one of: one or more of the positions indicated by the challenge or one or more positions not indicated by the challenge, but in this case, it may be expected that the plurality of positions may be positions indicated by the challenge.

In the illustrated embodiments, in stage 812, device 130 or 140 that is responding to the challenge may send a response to the challenge. The response may be at least indicative of values obtained in stage 808.

The manner that the response may be indicative of these obtained values is not limited, but for the sake of further illustration, some examples are now provided. For example, the response may be indicative of an obtained value, by specifying the obtained value. In another example, the response may be additionally or alternatively indicative of at least one of the obtained values by including a hash value resulting from applying a hash function to (or in other words hashing) the at least one of the obtained values. In another example, the response may be additionally or alternatively indicative of at least one of the obtained values by including a value resulting from applying another function to the at least one of the obtained values. For instance, device 130 or 140 may hash at least one obtained value and/or apply another function to at least one obtained value. A hash function that may be used for hashing may be any hash function. Obtained values may be hashed, for example, in order to reduce the size of the response that is sent.

In another example, the response may be additionally or alternatively indicative of a plurality of obtained values by including a (calculated) value that may be calculated based on a generated histogram of the plurality of obtained values. For instance, assume that there is a plurality of positions that are all positions relating to frame 1 (or in other words that the range of positions includes the entire frame). A histogram may be generated for the obtained values of pixels associated with these positions. The calculated value may be e.g. the standard deviation calculated for the histogram. This procedure may be repeated for other pluralities of positions, such as all positions in frame 5, all positions in frame 40, all positions in frame 99, all positions in frame 123, all positions in frame 214, all positions in frame 274, all positions in frame 315, all positions in frame 333, all positions in frame 366, all positions in frame 399, and all positions in frame 415. The calculated values (calculated for each of these frames) may be included in the response. In another instance, histograms for some or all of the above frames may be generated using obtained values associated with only some of the positions per frame, e.g. x: y in range: 0:500, 200:350. It should be evident that the frames and ranges discussed in this paragraph are not binding and in other instances other frame(s) and/or range(s) may be used when generating histogram(s) in this example.

In some embodiments, the obtained values which are indicated by the response may be values of pixels associated with positions indicated by the challenge received in stage 804. However, in some other embodiments this may not necessarily be the case. For example, as described above, it is possible that device 130 or 140 responding to the challenge may not be operative to necessarily obtain a value of a pixel associated with the actual frame indicated by the challenge due to technical limitations. Therefore in some of these other embodiments, for instance, the obtained values which are indicated by the response may be values of pixels, whose positions may not necessarily have been indicated in the challenge received in stage 804. In this instance, positions may be indicated by the response due to the possibility that the positions associated with the obtained values may not be the same as those indicated by the challenge. However in other instances, positions may be indicated in the response regardless of whether there exists such a possibility, for instance because the response may include a copy of the challenge, or for the convenience of validating supporting device 120. Therefore the obtained values indicated by the response may be values of pixels indicated by at least one of the challenge or response. It is noted that if the challenge is included in the response and the response is also separately indicative of positions associated with the obtained values, the separately indicated positions may or may not be the same as the positions indicated by the included challenge.

In embodiments where the response may be indicative of positions, the manner that the response may be indicative of the positions of the pixels is not limited. Examples provided above regarding the manner that the challenge may be indicative of positions may be applicable to the response, mutatis mutandis.

In some embodiments, the response that is sent may include the data that was included in the challenge or a part thereof. For example, the response may include indication(s) of any of: positions, challenge identifier, time, second content identifier, first content identifier, signature, user device identifier, session identifier, etc. that were indicated by the challenge received in stage 804. In some of these embodiments, what is indicated or not indicated by the response may depend on the implementation, as discussed above.

The sending of the response may enable validating supporting device 120 to attempt to validate the response. For example, an attempt to validate the response may include validating supporting device 120 determining values of the pixels in the video that are associated with positions indicated by at least one of: the challenge or the response and comparing the obtained values indicated by the response, or a function, thereof to the determined values, or a function thereof, as described above with reference to method 700.

In some embodiments, at least one action related to access to the first content may be performed dependent on whether or not the attempt to validate the response was successful. The action(s) may be performed by any device(s) in system 100. Some examples of action(s) that may be performed by validating supporting device 120 were described above with reference to stage 716. In some of these examples, user device 130 or pseudo user device 140 may participate in the action(s), perform complementary action(s) and/or perform reactive action(s). For instance, if first content is sent, user device 130 may receive the first content. In another instance, if first content is sent, user device 130 may receive the first content unless overridden by user device 130. In another instance, user device 130 may adjust how the first content is accessed. In another instance, if other content is sent, the other content may be received by user device 130. In another instance, if a different challenge is sent, user device 130 or pseudo user device 140 may repeat stages 804 to 812.

In some embodiments where user device 130 may be responding to the challenge, user device 130 may provide the video for display, for instance during method 800 or after method 800. In some other embodiments, device 130 or 140 which may be responding to the challenge may not provide the video for display, possibly to the detriment of the user as discussed above.

In some embodiments, stage(s) shown in FIG. 7 or FIG. 8 may be performed in a different order, and/or two or more stages may be performed simultaneously. Additionally or alternatively, in some embodiments, method 700 or 800 may include fewer, more and/or different stages than illustrated in FIG. 7 or 8. respectively.

In this description of example embodiments, numerous specific details are set forth in order to provide a thorough understanding of the subject matter. However, it will be understood by those skilled in the art that some examples of the subject matter may be practiced without these specific details. In other instances, well-known features have not been described in detail so as not to obscure the subject matter.

Usage of the terms "normally", "typically although not necessarily", "although not necessarily so", "such as", "e.g.", "possibly", "it is possible", "optionally", "say", "one embodiment", "embodiments", "an embodiment", "some embodiments", "certain embodiments", "example embodiments", "various embodiments", "other embodiments", "some other embodiments", "illustrated embodiments", "another embodiment", "for example" "one example", "an example" "some examples", "examples", "another example", "various examples", "other examples", "for instance", "an instance", "one instance", "some instances", "another instance", "other instances", "various instances" "one case", "cases", "some cases", "another case", "other cases", "various cases", or variants thereof should be construed as meaning that a particular described feature is included in at least one non-limiting embodiment of the subject matter, but not necessarily in all embodiments. The appearance of the same term does not necessarily refer to the same embodiment(s).

The term "illustrated embodiments", is used herein to direct the attention of the reader to one or more of the figures, but should not be construed as necessarily favoring any embodiments over any other.

Usage of conditional language, such as "may", "can", "could", or variants thereof should be construed as conveying that one or more embodiments of the subject matter may include, while one or more other embodiments of the subject matter may not necessarily include, a particular described feature. Thus such conditional language is not generally intended to imply that a particular described feature is necessarily included in all embodiments of the subject matter.

In the description herein, the term "indicative of" (e.g. the challenge may be indicative of positions), may be used interchangeably with the term "indicated by" (e.g. positions indicated by the challenge), indication of (e.g. indication(s) of positions), indicated (e.g. indicated positions) and/or variants thereof.

The term "play" is used herein to refer to a process where frames of digital video are restored. Restoration may include decoding (also referred to as decompressing) digital video data, frame by frame. As is known in the art, decoding may vary. For instance, one possible decoding standard may be H.264. A video which may be decoded in accordance with this standard may have used inter-frame prediction to reduce digital video data, e.g. before transmission or storage. Reference to the current frame that is being played may refer to the frame whose digital video data is currently being separated or restored. The verb "display" is used herein to refer to a process where video is displayed to the user, frame by frame. Displaying may only occur if playing occurs, but playing may occur even if displaying does not occur. Video which is displayed to a user may not necessarily be viewed by the user, as the user may ignore the displayed video, but video which a user views is necessarily video that has been played and displayed.

The terms "a video", "video", "the video", "said video", and variants thereof should be understood to cover embodiments, where the video includes one video segment or a plurality of video segments. A video segment may be intuitively recognizable as standalone (e.g. as including both a beginning and an ending). In some examples, each video segment may be in a separate video file, but in other examples this may not necessarily be the case. Each video segment, or if more than one video segment is included in the video the various video segments, may or may not be of the same type (e.g. set-up, training, promotional, warning, etc.) and therefore the video may or may not relate to only one type.

As used herein terms such as "requesting", "sending", "transmitting", receiving", "attempting", "validating", "determining". "comparing", "performing", "checking", "causing", "generating", "playing", "obtaining", "displaying", "hashing", "calculating", "processing", "configuring", "selecting", "defining", "computing", "accessing", "providing", "executing", "communicating", "collecting", "using", "presenting", "verifying", "authenticating", "enabling", "identifying", "acting", "applying", "allowing", "challenging", "responding", "fulfilling", "directing", or the like should be construed as referring to the action(s) and/or process(es) of any of device(s) 120, 130 and/or 140 described above. Although not necessarily so, the action(s) and/or process(es) may, for instance, manipulate and/or transform data represented as physical quantities, such as electronic quantities, into other data similarly represented as physical quantities.

In some embodiments, each device 120, 130 and/or 140 may be made up, as appropriate, of software, hardware, or firmware or of any combination of software, hardware and/or firmware capable of performing the operation(s) attributed to the device above in those embodiments. It is noted however, that operation(s) attributed to a particular device in some embodiments may in some other embodiments be additionally or alternatively performed by one or more other devices. The term "computer" as used herein may refer to any type of electronic device that includes at least one processor, such as any of devices 120, 130 and/or 140 described above, even if not colloquially referred to as a computer. The term "processor" as used herein may refer to any type of processor, such as a load store processor (e.g. central processing unit, graphics processing unit, etc.), a programmable very long instruction word engine, etc.

Any of devices 120, 130, and/or 140 may be specially constructed to perform operation(s) described herein. Additionally or alternatively, any of devices 120, 130, and/or 140 may be specially configured to perform operation(s) described herein by computer readable program code embodied in a computer readable medium, readable by the device. Such program code may be written in any appropriate language(s), and therefore reference to any particular language herein should not be considered binding. The duration that the program code may remain embodied in the computer readable medium, may vary depending on the embodiment, for example depending on the type of program code, type of medium, type of device reading the program code, etc., and therefore is not limited by the subject matter. The location of a computer readable medium embodying program code relative to any device which reads the program code may vary. The computer readable medium embodying the program code may be any suitable storage medium (e.g. volatile, non-volatile, for long term storage, for short term storage, etc.), and/or may be any suitable medium for transferring the program code between devices via any of network(s) 150.

Each of the modules illustrated in FIGS. 2, 3, 4, 5 and/or 6 when included, may be made up, as appropriate, of software, hardware, or firmware or of any combination of software, hardware and/or firmware capable of performing the operation(s) attributed to the module in those embodiments. It is noted however, that operation(s) attributed to a particular module in some embodiments may in some other embodiments be additionally or alternatively performed by one or more other module(s). Each particular module may be referred to herein in the single form, but the reference should be construed as covering embodiments where there is a single particular module or a plurality of the particular module. Modules illustrated in any one of the figures may be concentrated in one location or distributed over a plurality of locations. For example, memory 692 may be remote and/or local to any processor 690.

In some embodiments, validating supporting device 120, challenger 252, device 130 or 140, challenge fulfiller 410, or device 600 may include fewer, more and/or different modules than illustrated in FIG. 2, 3, 4, 5, or 6 respectively.

For example, in some of these embodiments, any of validating supporting device 120, challenger 252, device 130 or 140, challenge fulfiller 410, or device 600 may include additional and/or modified module(s) to perform additional and/or modified operations. For instance, validating supporting device 120 may include additional and/or modified operations relating and/or unrelated to supporting conditional content access. For another instance, challenger 252 may include additional and/or modified module(s) to perform additional and/or modified operations related to and/or unrelated to handling a challenge. For another instance, user device 130 may include additional and/or modified module(s) for requesting access to first content. For another instance, device 130 or 140 may include additional and/or modified module(s) for participating in one or more action(s) performed dependent on whether or not the attempt to validate the response was successful. For another instance, user device 130 may include additional and/or modified module(s) to perform additional and/or modified operations, conventionally performed by user devices of the type of user device 130, which may or may not be related to video playing. For another instance, pseudo user device 140 may include additional and/or modified module(s) to perform additional and/or modified operation(s), which may or may not be related to preventing display of video to a user.

In some embodiments, the functionality of two or more modules illustrated in any one of FIG. 2, 3, 4, 5, or 6, or any part(s) thereof, may be combined in one module, and/or the functionality of any one module illustrated in any one of FIG. 2, 3, 4, 5, or 6, may be divided among two or more modules. For example, in some of these embodiments, content provider 254 and content indexer 258 may be combined in the same module. For another example, in some of these embodiments, at least part of the operation(s) attributed to player 412 and at least part of the operation(s) attributed to challenge fulfiller 410 may be performed by a browser which may be used for playing or assisting in playing video (e.g. under HTML5 or other standard) and for performing at least part of challenge fulfillment (e.g. by executing or assisting in executing script(s) relating to challenge fulfillment).

It will be appreciated that the subject matter contemplates, for example, a computer program product comprising a computer readable medium having computer readable program code embodied therein for executing one or more method(s) or part(s) of method(s) disclosed herein. Further contemplated, for example are computer readable program code for executing method(s) or part(s) of method(s) disclosed herein and/or a computer readable medium having computer readable program code embodied therein for executing method(s) or part(s) of method(s) disclosed herein.

It will be appreciated that various features of the disclosure which are, for clarity, described in the contexts of separate embodiments may also be provided in combination in a single embodiment. Conversely, various features of the disclosure which are, for brevity, described in the context of a single embodiment may also be provided separately or in any suitable sub-combination. It will be appreciated by persons skilled in the art that the present disclosure is not limited by what has been particularly shown and described hereinabove. Rather the scope of the disclosure is defined by the appended claims and equivalents thereof.

What is claimed is:

1. A method, comprising:
in response to a request of a user device to access first content, sending a challenge, relating to digital video included in second content, the challenge at least indicative of positions that include a plurality of frames of the digital video;
receiving a response to the challenge, the response comprising one of an identity of the challenge, a copy of the challenge, or indications of the positions of the challenge and an identity of the second content and at least indicative of values of pixels obtained as a result of the digital video being played, wherein the values of the pixels are associated with at least one of color and brightness at a plurality of positions of the digital video being played;
attempting to validate the response, including determining values of pixels in the digital video associated with positions indicated by the challenge, as determined from one of the identity of the challenge, the copy of the challenge, or the indications of the positions of the challenge and the identity of the second content included in the response, and comparing the values indicated by the response, or a function thereof, to the determined values, or a function thereof, wherein the attempting to validate the response will not be successful if the values indicated by the response are not obtained as a result of the digital video being played;
determining that the attempting to validate the response is successful in response to determining that the values indicated by the response or the function thereof, and the determined values or the function thereof, are different and match each other for more than a predetermined threshold percentage; and
performing at least one action relating to access to the first content to reduce use of network resources, in response to determining that the attempting to validate the response was successful.

2. The method of claim 1, wherein the attempting further includes:
comparing first positions indicated by the response, or a function thereof, to second positions indicated by the challenge, or a function thereof.

3. The method of claim 2, wherein a first position or group of positions from among the first positions is successfully compared to a second position or group of positions from among the second positions, if a first frame of the first position or group of positions is within a predetermined range that includes a second frame of the second position or group of positions, and positioning within the first and second frames is identical.

4. The method of claim 1, wherein the attempting further includes:
checking at least one of: a time indicated by the challenge, or a signature included in the response.

5. The method of claim 1, wherein at least one of the positions is different from any position indicated by another challenge that was most recently sent relating to the digital video, if any.

6. The method of claim 1, wherein the at least one action includes sending or causing the first content to be sent to the user device.

7. The method of claim 1, further comprising:
determining that a device that is the user device or another device that will receive the challenge is not operative to fulfill the challenge; and
sending or causing to be sent to the device, or directing the device to, computer readable program code which when executed causes the device to fulfill the challenge.

8. The method of claim 1, further comprising: generating an index of values of all pixels in the digital video by position, wherein the determining values of the pixels includes accessing the index.

9. The method of claim 1, wherein the plurality of frames includes at least one frame from every decile of frames of the digital video.

10. The method of claim 1, wherein the digital video relates to at least one of: set-up, training, promotion, or warning.

11. The method of claim 1, wherein the challenge is further indicative of at least one of: an identity of the first content, the identity of the second content, an identity of the user device, an identity of a session, or the identity of the challenge.

12. The method of claim 1, further comprising:
receiving the challenge;
as a result of the digital video being played, obtaining the values of pixels in the digital video that are associated with the plurality of positions including at least one of: one or more of the positions indicated by the challenge, or one or more positions not indicated by the challenge; and
sending the response, wherein the values indicated by the response are the obtained values.

13. The method of claim 12, further comprising:
performing an ongoing hash including: hashing certain data included in the received challenge in order to determine a particular position from the positions indicated by the challenge, and hashing the determined particular position in order to determine a later position from the positions indicated by the challenge.

14. The method of claim 12, further comprising:
hashing at least one of the obtained values to a resultant hash value, wherein the response is indicative of the at least one of the obtained values by including the hash value.

15. The method of claim 12, further comprising:
generating a histogram of a plurality of the obtained values, and calculating a calculated value based on the histogram, wherein the response is indicative of the plurality of the obtained values by including the calculated value.

16. The method of claim 12, further comprising:
estimating time that is to elapse from a beginning of the digital video until a frame included in at least one of the positions indicated by the challenge is to be played; and
when the time has elapsed, determining a current frame that is being played, wherein obtaining the values includes: obtaining at least one value of at least one pixel positioned within the current frame, and wherein at least a positioning of the at least one pixel in the current frame is in accordance with the at least one of the positions indicated by the challenge.

17. The method of claim 12, further comprising:
providing the digital video for display.

18. The method of claim 1, wherein the response further comprises a response time that indicates one of a time that the response is generated or a time that the response is received and the attempting to validate the response further comprises:

checking a time indicated by the challenge; and comparing the time indicated by the challenge and the response time to determine a difference between the time indicated by the challenge and the response time, wherein the attempting to validate the response will not be successful if the difference is less than one of a minimum time to play the digital video or an end of transmission of transmission of the digital video or if the difference is greater than a maximum number of minutes.

19. A system comprising at least one device that includes at least one processor, the at least one processor being configured to:

send a challenge relating to digital video included in second content in response to a request to access first content, the challenge at least indicative of positions that include a plurality of frames of the digital video;

receive a response to the challenge, the response comprising one of an identity of the challenge, a copy of the challenge, or indications of the positions of the challenge and an identity of the second content and at least indicative of values of pixels obtained as a result of the digital video being played, wherein the values of the pixels are associated with at least one of color and brightness at a plurality of positions of the digital video being played;

attempt to validate the response, including determining values of pixels in the digital video associated with positions indicated by the challenge, as determined from one of the identity of the challenge, the copy of the challenge, or the indications of the positions of the challenge and the identity of the second content included in the response, and comparing the values indicated by the response, or a function thereof, to the determined values, or a function thereof, wherein the attempt to validate the response will not be successful if the values indicated by the response are not obtained as a result of the digital video being played;

determine that the attempting to validate the response is successful in response to determining that the values indicated by the response or the function thereof, and the determined values or the function thereof, are different and match each other for more than a predetermined threshold percentage; and perform at least one action relating to access to the first content to reduce use of network resources, in response to determining that the attempt to validate the response was successful.

20. The system of claim 19, wherein the at least one processor is further configured to:

receive the challenge;

as a result of the digital video being played, obtain the values of pixels in the digital video that are associated with the plurality of positions including at least one of: one or more of the positions indicated by the challenge, or one or more positions not indicated by the challenge; and send the response, wherein the values indicated by the response are the obtained values.

21. A computer program product comprising a non-transitory computer readable medium having computer readable program code which, when executed by a processor, causes the processor to:

send a challenge relating to digital video included in second content in response to a request to access first content, the challenge at least indicative of positions that include a plurality of frames of the digital video;

receive a response to the challenge, the response comprising one of an identity of the challenge, a copy of the challenge, or indications of the positions of the challenge and an identity of the second content and at least indicative of values of pixels obtained as a result of the digital video being played, wherein the values of the pixels are associated with at least one of color and brightness at a plurality of positions of the digital video being played;

attempt to validate the response, including determining values of pixels in the digital video associated with positions indicated by the challenge, as determined from one of the identity of the challenge, the copy of the challenge, or the indications of the positions of the challenge and the identity of the second content included in the response, and comparing the values indicated by the response, or a function thereof, to the determined values, or a function thereof, wherein the attempt to validate the response will not be successful if the values indicated by the response are not obtained as a result of the digital video being played;

determine that the attempting to validate the response is successful in response to determining that the values indicated by the response or the function thereof, and the determined values or the function thereof, are different and match each other for more than a predetermined threshold percentage; and perform at least one action relating to access to the first content to reduce use of network resources, in response to determining that the attempt to validate the response was successful.

* * * * *